United States Patent
Rees et al.

(10) Patent No.: US 11,402,201 B2
(45) Date of Patent: Aug. 2, 2022

(54) COORDINATE POSITIONING APPARATUS AND METHOD OF OPERATION

(71) Applicant: RENISHAW PLC, Wotton-under-Edge (GB)

(72) Inventors: Martin Simon Rees, Thornbury (GB); Toby John Main, Bristol (GB); James Arash Shabani, Bristol (GB)

(73) Assignee: RENISHAW PLC, Wotton-under-Edge (GB)

(*) Notice: Subject to any disclaimer, the term of this patent is extended or adjusted under 35 U.S.C. 154(b) by 223 days.

(21) Appl. No.: 16/340,785

(22) PCT Filed: Nov. 9, 2017

(86) PCT No.: PCT/GB2017/053379
§ 371 (c)(1),
(2) Date: Apr. 10, 2019

(87) PCT Pub. No.: WO2018/091867
PCT Pub. Date: May 24, 2018

(65) Prior Publication Data
US 2020/0049498 A1    Feb. 13, 2020

(30) Foreign Application Priority Data
Nov. 16, 2016 (EP) .................................... 16275164

(51) Int. Cl.
*G01B 5/008* (2006.01)
*G01B 21/04* (2006.01)
*G05B 19/401* (2006.01)

(52) U.S. Cl.
CPC .......... *G01B 21/042* (2013.01); *G01B 5/008* (2013.01); *G05B 19/401* (2013.01); *G05B 2219/37193* (2013.01); *G05B 2219/39019* (2013.01)

(58) Field of Classification Search
CPC .................................................... G01B 21/042
(Continued)

(56) References Cited

U.S. PATENT DOCUMENTS

| 5,610,846 A | 3/1997 | Trapet et al. |
| 6,633,051 B1 | 10/2003 | Holloway et al. |

(Continued)

FOREIGN PATENT DOCUMENTS

| CN | 104034228 A | 9/2014 |
| CN | 105444707 A | 3/2016 |

(Continued)

OTHER PUBLICATIONS

May 15, 2017 Extended Search Report issued in European Patent Application No. 16275164.8.

(Continued)

*Primary Examiner* — Ricky Go
(74) *Attorney, Agent, or Firm* — Oliff PLC

(57) ABSTRACT

A method of calibrating a contact probe having a deflectable stylus and configured to provide at least one signal which is indicative of the extent of deflection of the stylus, the contact probe being mounted on a coordinate positioning machine which facilitates reorientation of the contact probe about at least one axis. The method includes: taking measurement data obtained with the contact probe positioned at a plurality of different orientations about the at least one axis; and determining from the measurement data at least one gain variation model which models any apparent variation in the gain of the at least one probe signal dependent on the orientation of the contact probe about the at least one axis.

17 Claims, 13 Drawing Sheets

(58) Field of Classification Search
USPC .......................................................... 702/95
See application file for complete search history.

(56) References Cited

U.S. PATENT DOCUMENTS

| | | | |
|---|---|---|---|
| 6,854,193 | B2 | 2/2005 | Lotze |
| 7,847,955 | B2 | 12/2010 | McFarland et al. |
| 8,756,973 | B2 | 6/2014 | Wallace et al. |
| 9,733,056 | B2 | 8/2017 | Pettersson et al. |
| 9,863,766 | B2 | 1/2018 | Wallace et al. |
| 2003/0233760 | A1 | 12/2003 | Lotze |
| 2004/0093179 | A1* | 5/2004 | Sutherland ............. B82Y 15/00 702/104 |
| 2007/0192052 | A1* | 8/2007 | Goto ........................ G01B 5/28 702/95 |
| 2009/0287444 | A1* | 11/2009 | Ishikawa .............. G01B 21/045 702/95 |
| 2009/0307915 | A1* | 12/2009 | Sutherland ........... G01B 21/042 33/502 |
| 2013/0173199 | A1* | 7/2013 | Guasco ................ G01B 21/045 702/95 |
| 2015/0241194 | A1* | 8/2015 | Nakagawa ........... G01B 21/045 702/95 |
| 2015/0377617 | A1 | 12/2015 | Ould |
| 2016/0084625 | A1 | 3/2016 | Pettersson et al. |
| 2017/0067729 | A1* | 3/2017 | Shaojun ................... G01B 5/28 |

FOREIGN PATENT DOCUMENTS

| | | |
|---|---|---|
| DE | 102 37 501 A1 | 3/2004 |
| EP | 0 402 440 B1 | 6/1995 |
| EP | 0 759 534 B1 | 11/2002 |
| EP | 1 391 684 A1 | 2/2004 |
| EP | 2 998 696 A1 | 3/2016 |
| JP | 2000-81328 A | 3/2000 |
| JP | 2008-539408 A | 11/2008 |
| JP | 2009-534681 A | 9/2009 |
| JP | 2011-208994 A | 10/2011 |
| JP | 2015-127714 A | 7/2015 |
| JP | 2016-526677 A | 9/2016 |
| WO | 00/25087 A1 | 5/2000 |
| WO | 00/62015 A1 | 10/2000 |
| WO | 02/27268 A1 | 4/2002 |
| WO | 02/27269 A1 | 4/2002 |
| WO | 02/073128 A1 | 9/2002 |
| WO | 03/038375 A1 | 5/2003 |
| WO | 2006/114603 A2 | 11/2006 |
| WO | 2006/114627 A1 | 11/2006 |
| WO | 2007/125306 A1 | 11/2007 |
| WO | 2012/004555 A1 | 1/2012 |
| WO | 2015/162431 A1 | 10/2015 |

OTHER PUBLICATIONS

Jan. 16, 2018 International Search Report issued in International Patent Application No. PCT/GB2017/053379.

Jan. 16, 2018 Written Opinion of the International Searching Authority issued in International Patent Application No. PCT/GB2017/053379.

* cited by examiner

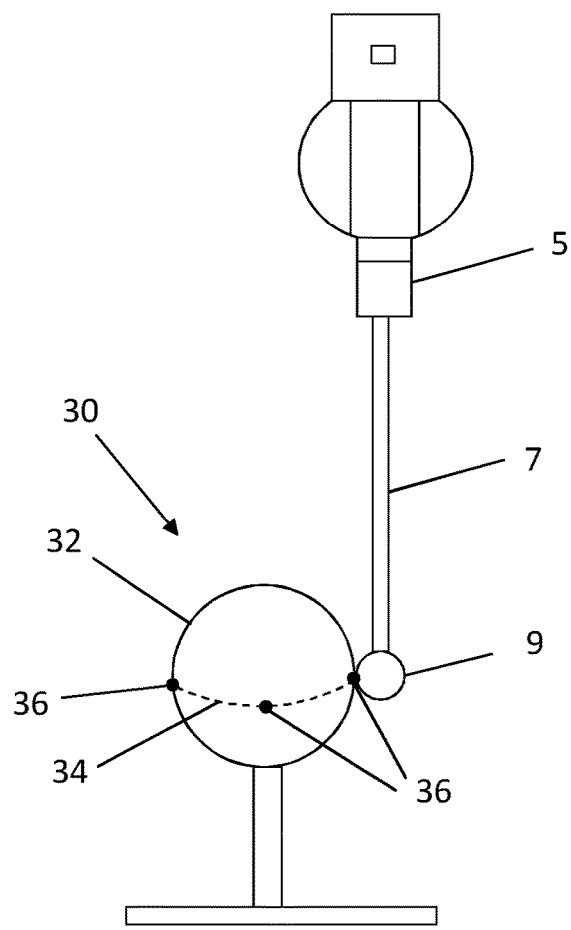
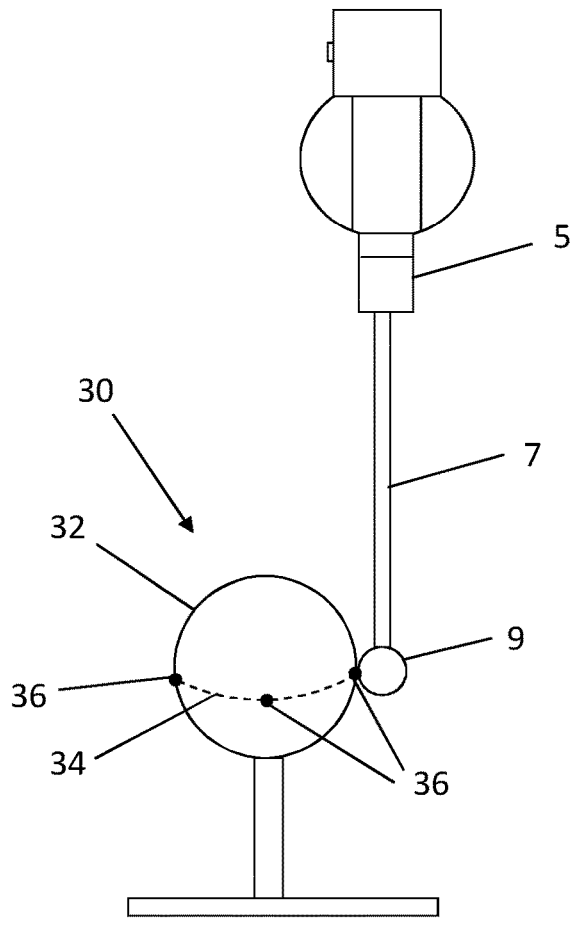
Fig. 7a
Fig. 7b

COORDINATE POSITIONING APPARATUS AND METHOD OF OPERATION

This invention relates to a coordinate positioning apparatus, and in particular to a method of operating a coordinate positioning apparatus.

Various types of coordinate positioning apparatus, such as coordinate measuring machines, machine tools, industrial robots etc, are known. Coordinate positioning apparatus typically include transducers that measure the position of a moveable platform or quill in a so-called machine co-ordinate system (e.g. $C_X$, $C_Y$, $C_Z$). The position of points on the surface of an object are measured using a measurement probe that is attached to, and moved around by, the moveable platform or quill. It is also often desirable to mount a measurement probe to the moveable platform/quill of a coordinate positioning apparatus via a probe head that allows the orientation of the measurement probe to be adjusted relative to the platform/quill. In particular, the ability to re-orientate the measurement probe relative to the platform/quill using such a probe head allows the inspection of differently orientated surfaces of an object.

One known type of contact measurement probe used with coordinate positioning apparatus comprises a probe housing and a deflectable stylus. Typically, the probe housing is mounted to the moveable platform or quill of the coordinate positioning apparatus and moved so as to bring the tip of the stylus into contact with the object to be measured. On contacting the object, the stylus deflects away from its so-called "undeflected", "rest" or "neutral" position and this stylus deflection is sensed by appropriate sensors. Measurement probes of this type may broadly be categorised as either touch trigger probes or analogue probes (also known as scanning probes). Touch trigger probes (also known as digital or switching probes) produce a trigger signal whenever the stylus deflection exceeds a certain threshold. Analogue probes produce probe signals that are indicative of the magnitude/extent (and optionally direction) of stylus deflection away from the stylus' neutral/rest position. For example, a scanning/analogue probe may comprise one or more transducers and may output one or more signals which are indicative of deflection of the stylus. In some probes the probe signal may be an aggregated deflection value, and could be direction/dimension independent. In some probes, the probe signals are direction/dimension dependent. If stylus deflection in more than one dimension is possible, then separate signals could be provided for each dimension. For example, the probe signal could indicate a deflection in at least one dimension, optionally two dimensions, for example three dimensions. Those dimensions could be mutually orthogonal. As will be understood, the term "analogue" is used to refer to the fact that the probe provides signals indicative of the extent of deflection of the stylus, and is not descriptive of the type/form of signal of the probe. Accordingly, as will be understood, the signal indicating the extent of deflection could be analogue or digital in form.

With a scanning/analogue probe, it is necessary to calibrate the probe so as to determine a so-called transformation model which is used for transforming/converting the probe signals into spatial measurement values. Typically, this comprises converting the probe signals into spatial measurement values in the probe's local co-ordinate system ($P_X$, $P_Y$, $P_Z$). This can also comprise converting the probe signals into spatial measurement values in the machine's co-ordinate system ($C_X$, $C_Y$, $C_Z$), e.g. when the probe is mounted on positioning apparatus which enables the probe to be rotated about at least one axis. Examples of methods for calibrating scanning probes, including calculation of a probe transformation matrix, are described in detail in WO00/25087, WO02/073128 and WO2006/114603, WO2012/004555.

As explained in WO2006/114603, if the probe is mounted on an articulated head and is to be used at different orientations, traditionally the calibration process is performed for each orientation. This substantially increases the time required for calibration. For example, the PH10 probe head sold by Renishaw plc, Wotton-Under-Edge, Gloucestershire, UK, can be indexed into 720 repeatable orientations and collecting calibration data for each orientation would clearly be a very time consuming task.

Calibrating for all possible orientations is also unrealistic when the probe is mounted on a continuous head, such as the REVO probe head sold by Renishaw plc, Wotton-Under-Edge, Gloucestershire, UK, since rather than providing a discrete number of orientations, such continuous heads provides for a so-called "near infinite" number of orientations, limited only by the resolution of the system. WO2006/114603 therefore provides a solution at which the probe transformation matrix is determined at one orientation, and then is rotated depending on the orientation of the probe.

The present invention relates to an improved method of calibrating a contact probe.

According to the present invention there is provided a method of calibrating a contact probe having a deflectable stylus and configured to provide at least one signal which is indicative of the extent of deflection of the stylus. The contact probe can be mounted on a coordinate positioning machine which facilitates reorientation of the contact probe about at least one axis. The method can comprise taking measurement data obtained with the contact probe positioned at a plurality of different orientations about the at least one axis. The method can comprise determining from the measurement data a gain variation model which models any apparent variation in the gain of the at least one probe signal dependent on the orientation of the contact probe about said at least one axis. As will be understood, the gain of the one or more probe signals quantifies how the one or more probe signals varies with stylus deflection (e.g. how the level of the one or more probe signals varies with stylus deflection) (e.g. in the probe's coordinate system). In other words, the method can comprise determining from the measurement data a model which models/corrects for the variation in the relationship between the at least one probe signals and the deflection of the stylus tip (e.g. away from its rest/zero force position), based on the orientation of the probe.

The inventors have identified that the effective/apparent gain of the at least one probe signal can vary depending on the orientation of the probe about the at least one axis. For example, they have identified that a given probe signal (e.g. a given level of probe signal) does not necessarily represent the same amount of stylus deflection and/or deflection in the same probe direction for all orientations of the probe about the at least one axis. This anomaly is explained in more detail below in connection with FIG. 2. The present invention compensates for this anomaly identified by the inventors by determining, and generating a model for modelling, the variation in the gain of the one or more probe signals. Such a model can then be used to correct/compensate for this apparent variation.

As will be understood, since the probe provides a signal (e.g. the level of) which is indicative of the extent of deflection of the stylus, then it is what is commonly known as an analogue probe or a scanning probe. As will be understood, this is in contrast to what are commonly referred to as "touch-trigger", "digital" or "switching type" probes which merely provide a signal indicative that deflection of the stylus (e.g. beyond a threshold) has taken place. As will be understood, as mentioned above, the term "analogue" in "analogue probe" refers to the fact that the probe provides signals indicative of the magnitude/extent of deflection of the stylus, and is not limited to merely providing a digital "deflected/non-deflected" signal. Accordingly, it will be understood that the term "analogue" is not descriptive of the form of the signal coming out of the probe. For example, the signal coming out of the probe which is used to indicate the extent of deflection could be analogue or digital in form.

Optionally, the measurement data is obtained at a plurality of different stylus deflections for at least one orientation about the at least one axis. Optionally, for a plurality of said different orientations about the at least one axis, measurement data is obtained at a plurality of different stylus deflections.

The contact probe could be configured to provide at least first and second probe signals. Optionally, the at least one gain variation model models any apparent variation in the gains of the at least first and second probe signals dependent on the orientation of the contact probe about said at least one axis. The apparent variation in the gain of the first probe signal dependent on the orientation of the contact probe could vary differently to that of the second probe signal.

Optionally, the positioning machine facilitates reorientation of the contact probe about at least two axes. Optionally, the at least two axes are perpendicular to each other. The method could comprise taking measurement data obtained with the contact probe positioned at a plurality of different orientations about the at least two axes. The method could further comprise determining from the measurement data at least one gain variation model which models any apparent variation in the gain of the at least one probe signal dependent on the orientation of the contact probe about the at least two axes.

Optionally, the at least one axis about which the contact probe can be rotated extends vertically. When there at least two axes about which the contact probe can be rotated, one could extend vertically, and another could extend horizontally.

Optionally, the measurement data comprises a first set of measurement data obtained at a first orientation about the at least one axis, and at least one second set of measurement data obtained at a second orientation about the at least one axis. Optionally, the at least one second set of measurement data is less comprehensive than the first set of measurement data. Optionally, the at least one second set of measurement data was obtained in less time than the first set of measurement data. Optionally, fewer measurement data/points were collected during the acquisition of the at least one second set of measurement data compared to the first set of measurement data. Optionally, the at least one second set of measurements are obtained by rotationally moving (i.e. reorienting) the contact probe around the at least one axis. Optionally, the first set of measurements are obtained by keeping the orientation of the contact probe about the at least one axis fixed and translationally moving the contact probe and/or the artefact. The method can comprise using at least the at least one second set of measurement data to determine how the gain of the one or more probe signals appears to vary depending on the orientation of the contact probe about the at least one axes.

The method can comprise determining an orientation-independent probe signal conversion model. The at least one gain variation model could be configured for correcting conversions made using the orientation-independent probe signal conversion model. The at least one gain variation model could be described as an orientation-dependent probe signal conversion model. The orientation-independent probe signal conversion model could be obtained from measurements obtained with the contact probe at a plurality of different orientations about a first one of said at least one axis. The orientation-independent probe signal conversion model could be an amalgamated/consolidated probe signal conversion model, in that it is determined from measurements obtained at a plurality of different orientations about the first one of said at least one axes. Optionally, the orientation-independent probe signal conversion model could be derived from the aforementioned more comprehensive measurement. The at least one gain variation model could be obtained from measurements obtained at at least one other orientation about a second one of said at least one axis (according in this case the articulated head facilitates rotation of the contact probe about at least two axes). The measurements for determining the at least one gain variation model can be less comprehensive than those obtained for the orientation-independent probe signal conversion model. Optionally, the at least one gain variation model are determined from the aforementioned less comprehensive measurements. Optionally, the measurements for determining the at least one gain variation model are obtained in less time than those measurements obtained for the orientation-independent probe signal conversion model. Optionally, fewer measurement points are collected for determining the at least one gain variation model compared to determining the orientation-independent probe signal conversion model. Optionally, the measurements for determining the at least one gain variation model are obtained by rotating the contact probe about the at least one axis. Optionally, the measurements for determining the orientation-independent probe signal conversion model are obtained by relatively translationally moving the contact probe and artefact with the contact probe held at a constant angular orientation about the at least one axis.

As will be understood, the measurement data can be scanned measurement data (e.g. data obtained by scanning the contact probe along the surface of the object).

Determining the at least one gain variation model could comprise: i) extracting a metric (e.g. a measured position, dimension, diameter, radius, ellipticity, etc) from measurements (e.g. scans) obtained with the contact probe at a plurality of different orientations about the at least one axis. Determining the at least one gain variation model could further comprise: ii) determining how that metric varies with stylus deflection. This could be determined from measurement data obtained at at least one stylus deflection, or a plurality of stylus deflections. Determining the at least one gain variation model could further comprise: iii) determining how (e.g. the slope of) that variation (determined in ii) varies with the different orientation about the at least one axis.

Optionally, the method can comprise subsequently using the contact probe to measure an artefact. The at least one gain variation model could be used to transform the probe's at least one probe signal into a spatial/positional value. This could comprise determining a correction factor from the gain variation model. The variation factor could be applied to the probe's at least one signal and/or to a (temporary/provisional) spatial measurement value determined from the signal. The spatial value could be a relative value (e.g. a position relative to a predetermined point in the coordinate positioning machine's coordinate system). The spatial measurement value could represent the extent of stylus deflection. The spatial measurement value could be a deflection measurement. The spatial measurement value could be an absolute value (e.g. an absolute point within the probe's or coordinate positioning machine's coordinate system). The gain variation model could be used to compensate for any apparent variation (in the gain of the at least one probe signal dependent on orientation) for a subsequent measurement obtained by the contact probe. The gain variation model could be used as part of a transformation model (e.g. for transforming the probe signals into a spatial measurement in the probe's and/or coordinate positioning machine's coordinate system). The transformation model could be described as an overarching transformation model. The transformation model could be configured to apply a rotation (dependent on the orientation of the contact probe about the at least one axis) such that determined spatial values are oriented so as to be in the coordinate positioning machine's coordinate system.

Optionally, the determined spatial measurement value(s) is(are) combined with other position information so as to determine an absolute position of the stylus tip in the coordinate positioning machine's coordinate system. For example, the other position information can be derived from one or more position encoders (e.g. linear and/or rotary) which are provided and configured to determine the relative position of one or more relatively moveable parts of the coordinate positioning apparatus on which the contact probe is mounted.

The coordinate positioning machine can comprise an articulated head that provides said at least one axis of rotation. The articulated head could comprise a continuous scanning articulated head. As will be understood, the continuous scanning articulated head facilitates positional measurement during reorientation (e.g. of the probe mounted thereon) about at least one axis, optionally about at least two axes. As will be understood, this is in contrast to an indexing head which has a defined number of orientations into which the head has to be fixed or "indexed" (e.g. locked) before measurement is performed. The articulated head could be mounted on a movement structure which facilitates translational movement of the head, e.g. in at least one, optionally at least two, for example three linear dimensions, which could for example be mutually perpendicular. The movement structure could comprise at least one linear guideway, optionally at least two linear guideways, for example three linear guideways, which could be mutually orthogonal, and could be arranged in series.

As will be understood, a model could comprise a mathematical model. A model could comprise, for example, a function, matrix and/or look-up table. Accordingly, for example, the at least one gain variation model could comprise at least one function. The at least one gain variation model could comprise at least one matrix. The at least one gain variation model could comprise a look up table. Using the at least one gain variation model could comprise interpolating between values in the look up table.

The method can comprise determining at least a first gain variation model which models apparent symmetric variations in the gain of the at least one probe signal dependent on the orientation of the contact probe about the at least one axis. The method can comprise determining a second gain variation model which models apparent asymmetric variations in the gain of the at least one probe signal dependent on the orientation of the contact probe about the at least one axis.

As will be understood, and as explained in more detail below, references to measurements being taken at an orientation about an axis could refer to an actual orientation or a nominal orientation.

As will be understood, the measurement data can be spatial/position measurement data. The measurement data can relate to an artefact, e.g. a calibration artefact, for instance a calibration sphere. The measurement data can comprise position measurements (e.g. regarding the surface of an artefact). The measurement data can comprise point position data. The measurement data can comprise dimension data regarding an artefact. The measurement data can be obtained from a scan of an artefact (e.g. by scanning the stylus of the contact probe along the surface of an artefact, as opposed to obtaining a plurality of single point measurements by touching the surface at a plurality of discrete points). The measurement data can comprise at least one single point measurement, optionally a plurality of single point measurements.

As will be understood, taking measurement data could comprise receiving/retrieving (historical) measurement data (e.g. previously measured). Optionally, taking measurement data could comprise operating the coordinate positioning apparatus to cause the contact probe to inspect an artefact (e.g. interact with an artefact so as to acquire the measurement data). The method could comprise deriving measurement data from the output(s) of the contact probe. An artefact could be inspected by moving the contact probe about the at least one axis. An artefact could be inspected by keeping the orientation of the contact probe about the at least one axis fixed and translationally moving the contact probe and/or the artefact.

The coordinate positioning machine could be a coordinate measuring machine (CMM). The coordinate positioning machine could be machine tool apparatus. The coordinate positioning apparatus could comprise a Cartesian or non-Cartesian positioning apparatus.

The contact probe could be what is known in the art as a tip sensing probe. The contact probe could comprise a transducer which as well as being configured to detect tilting of the stylus can also detect bending of the stylus. The could be via an optical element located distal to the probe body, for example proximal to or at the stylus tip, the relative position of which can be sensed. For example, the contact probe could comprise an optical transducer system. Said optical transducer system could comprise a light source for producing a beam of light directed (e.g. internally of the stylus) towards the tip of the stylus, and a detector positioned relative to the beam to receive the beam and to produce a signal indicative of the lateral (and/or longitudinal) displacement of the stylus tip (e.g. as described in U.S. Pat. No. 6,633,051 and/or WO2006114627).

As will be understood, features described above in connection with the first aspect of the invention are applicable to the below described other aspects of the invention, and vice versa.

According to another aspect of the invention there is provided a method of transforming at least one probe signal from a contact probe into a spatial measurement value. The contact probe can be mounted on an articulated head of a coordinate positioning machine (e.g. a continuous scanning articulated head) which facilitates reorientation of the contact probe about at least one axis during the collection of measurements using the contact probe. The method can comprise converting the probe signal into a spatial measurement value using at least one probe signal gain variation correction factor which is dependent on the orientation of the contact probe about the at least one axis.

The converting step can comprise also applying a rotation such that determined spatial measurement values are oriented so as to be in the positioning machine's coordinate system.

According to another aspect of the invention there is provided a method of calibrating a contact (analogue) probe having a deflectable stylus and configured to provide at least one signal which is indicative of the extent of deflection of the stylus. The contact probe can be mounted on a coordinate positioning machine which facilitates reorientation of the contact probe about at least one axis. The method can comprise determining a common/amalgamated/consolidated probe signal conversion model for transforming probe signals into spatial measurements (e.g. in the probe's coordinate system) from measurement data obtained with the contact probe positioned at a plurality of different orientations about the at least one axis. This is in contrast to determining a probe signal conversion model from measurements obtained at just one orientation. The probe signal conversion model could be an orientation-independent probe signal conversion model (in that it does not take as an input the orientation of the contact analogue probe about the at least one axis). The method can comprise using the common/amalgamated/consolidated probe signal conversion model to convert probe signals into spatial measurements for a range of orientations of the contact probe about the at least one axis. For example, the method can comprise receiving probe signals with the contact probe at a first and second different orientations, and using the same common/amalgamated/consolidated probe signal conversion model to convert those probe signals into spatial measurements. The spatial measurements can be in the probe's coordinate system. A gain variation model (e.g. as described above) can be used to compensate for apparent variations in the gain of the probe signal dependent on orientation of the contact probe.

This application also describes a method of calibrating a contact (analogue) probe having a deflectable stylus and which is configured to provide one or more probe signals in response to deflection of the stylus away from a rest position, the contact probe being mounted on a coordinate positioning machine which facilitates reorientation of the contact probe about at least one axis, comprising: for a first orientation about the at least one axis, perform a first measurement procedure so as to obtain a first set of measurements; and for at least one other orientation perform another, less comprehensive or less time consuming, measurement procedure. The measurements could be used to determine a probe gain variation model. For example, the first set of measurements could be used to determine an orientation independent probe signal conversion model. For example, the second set of measurements could be used to determine a probe gain variation model.

According to another aspect of the invention there is provided an apparatus, comprising a positioning apparatus comprising an articulated head on which a contact (analogue) probe is mounted. The articulated head can be configured to facilitate reorientation of the contact probe about at least one axis. The apparatus can comprise at least one controller or processor device, configured to operate in accordance with any of the above described methods. The controller/processor device could comprise at least one module (e.g. an electronic or a software module) configured to operate in accordance with any of the above described methods.

According to another aspect of the invention there is provided a computer program (e.g. a computer program product) comprising instructions which when executed by at least one processor device causes the at least one processor device to perform any of the above described methods. According to another aspect of the invention there is provided a computer readable medium or a data carrier comprising instructions which when executed by at least one processor device, causes the at least one processor device to perform any of the above described methods.

Embodiments of the invention will now be described, by way of example only, with reference to the following drawings, in which:

FIG. 1 shows a schematic isometric view of a coordinate measuring machine on which a contact probe is mounted;

FIGS. 2a and 2b schematically illustrate the variation in probe signal for a given stylus deflection dependent on orientation about an axis;

Figure 4:
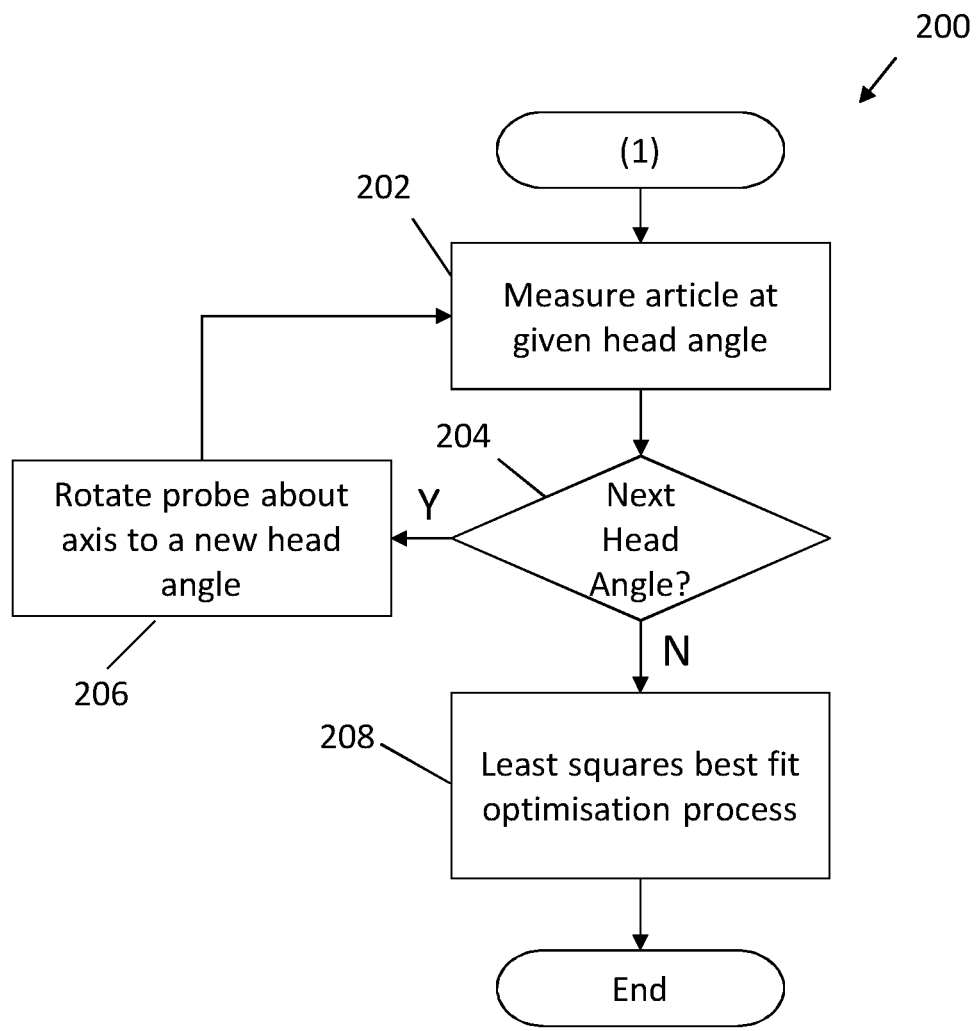
FIG. 4 illustrates an example process for determining a probe signal conversion model.
Figure 8A:
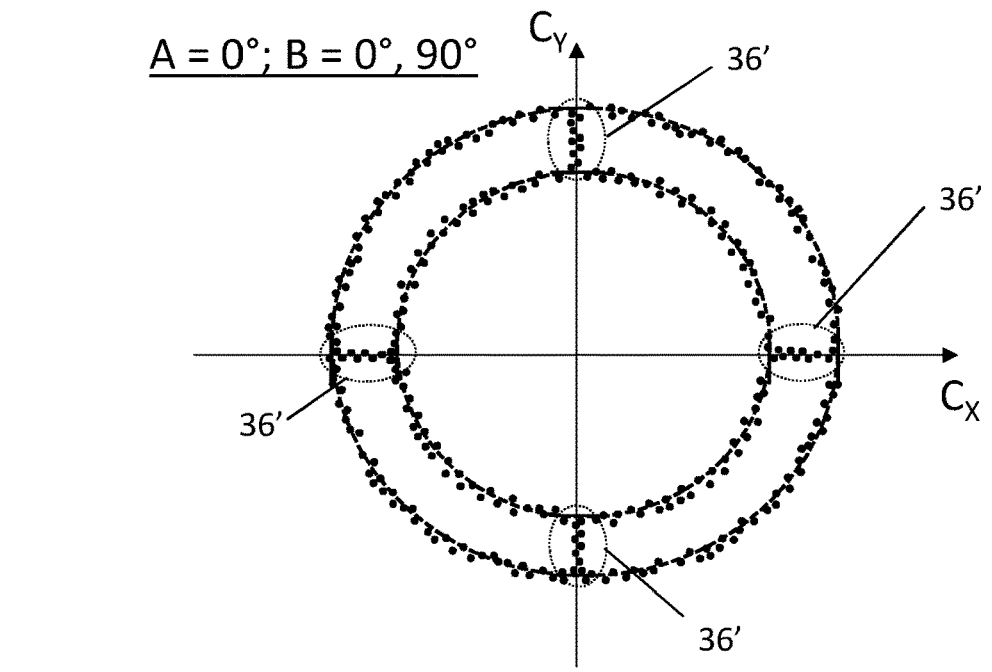
Figure 8B:
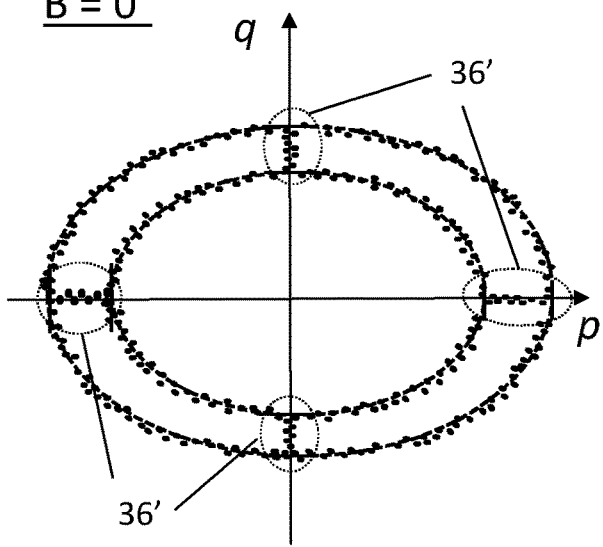
Figure 8C:
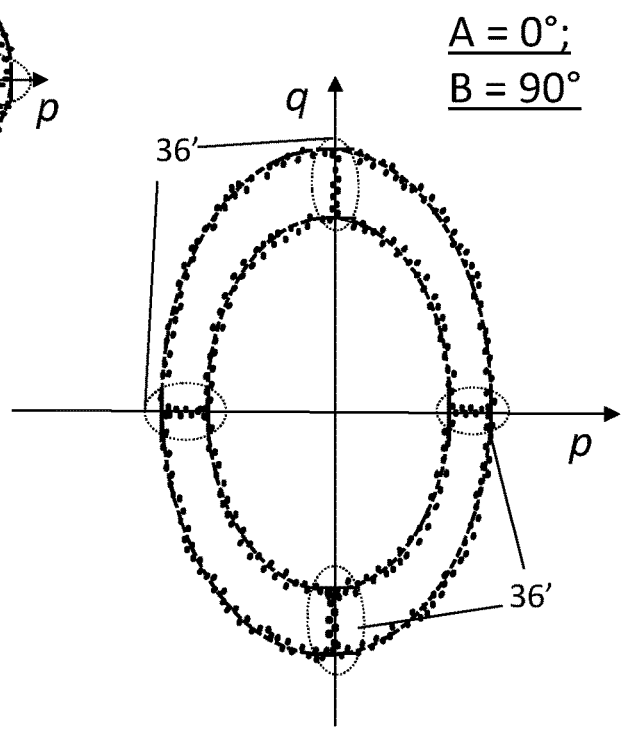
Figure 9:
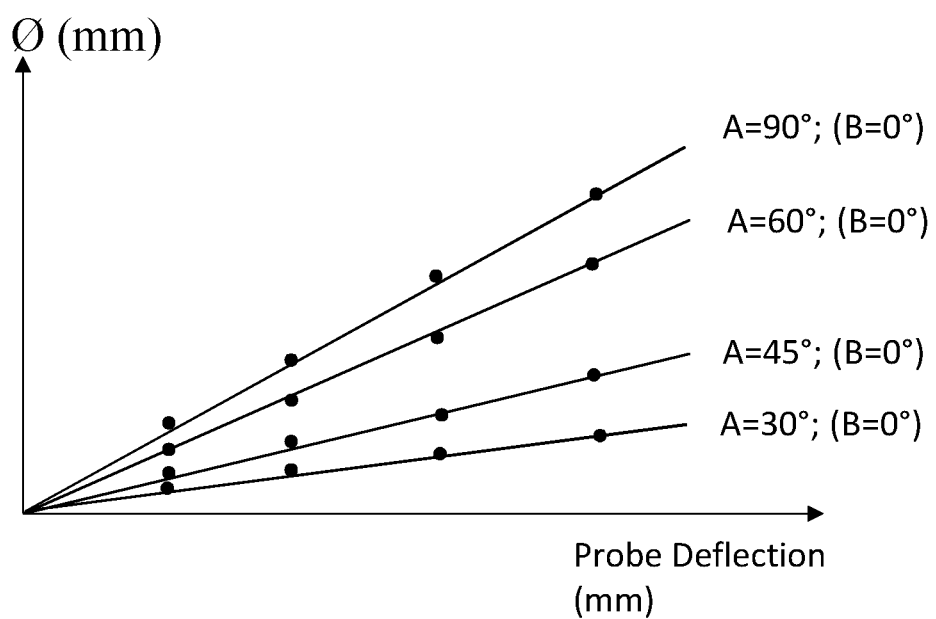
Figure 10A:
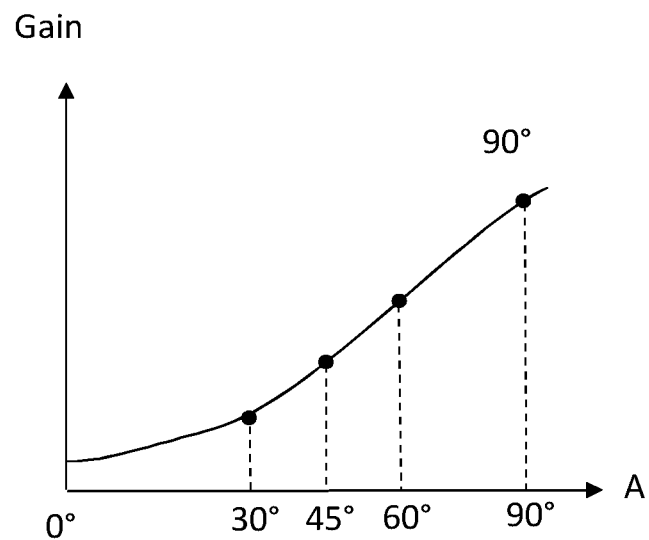
Figure 10B:
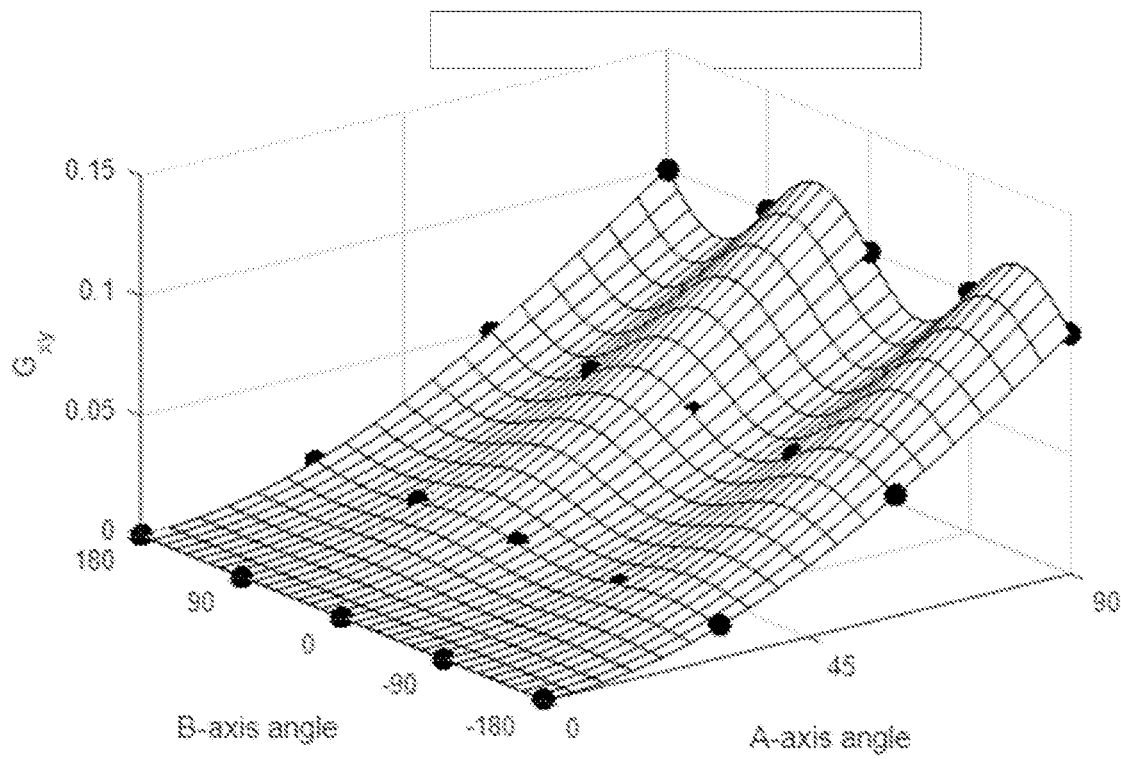
Figure 11:
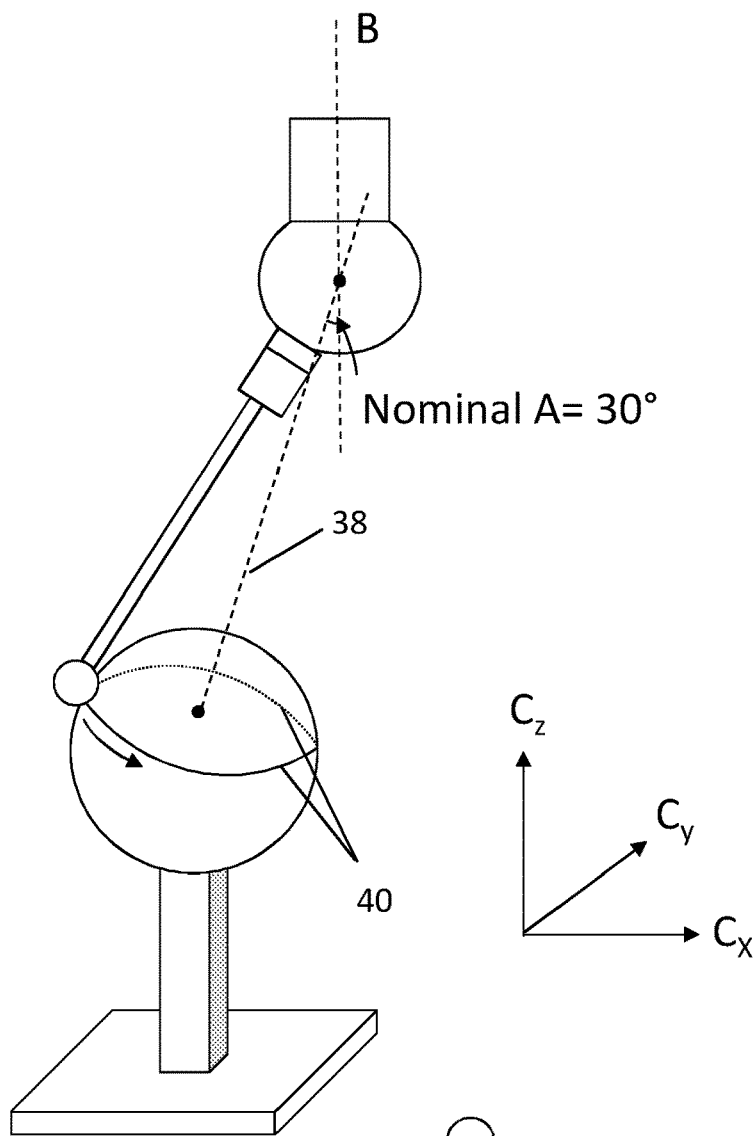
Figure 12:
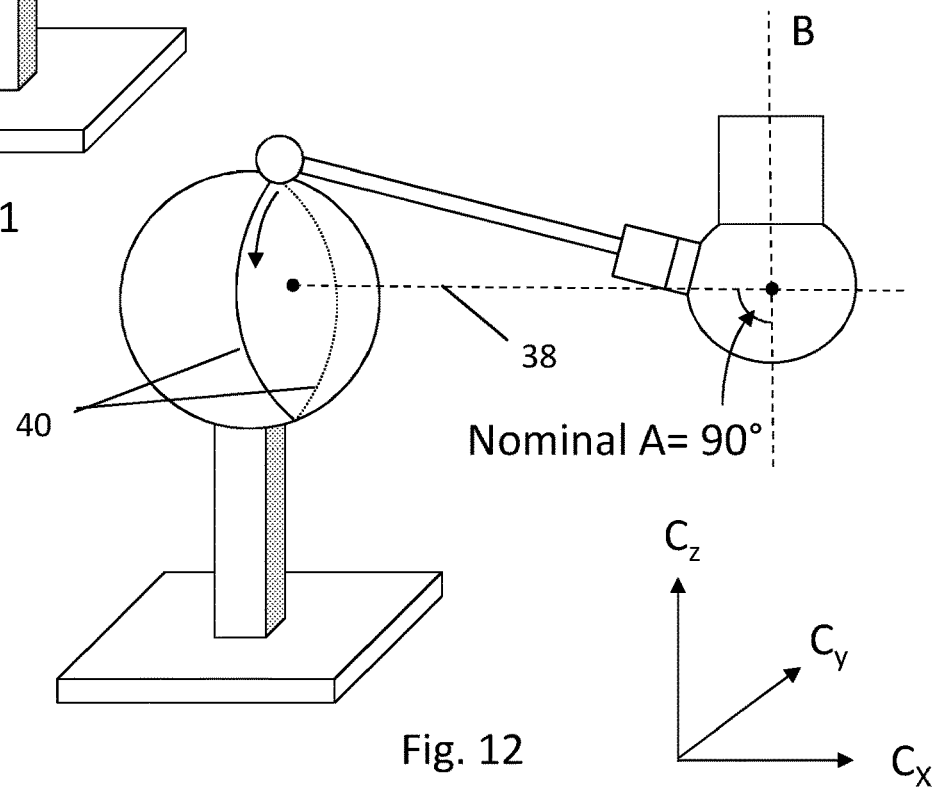
Figure 13:
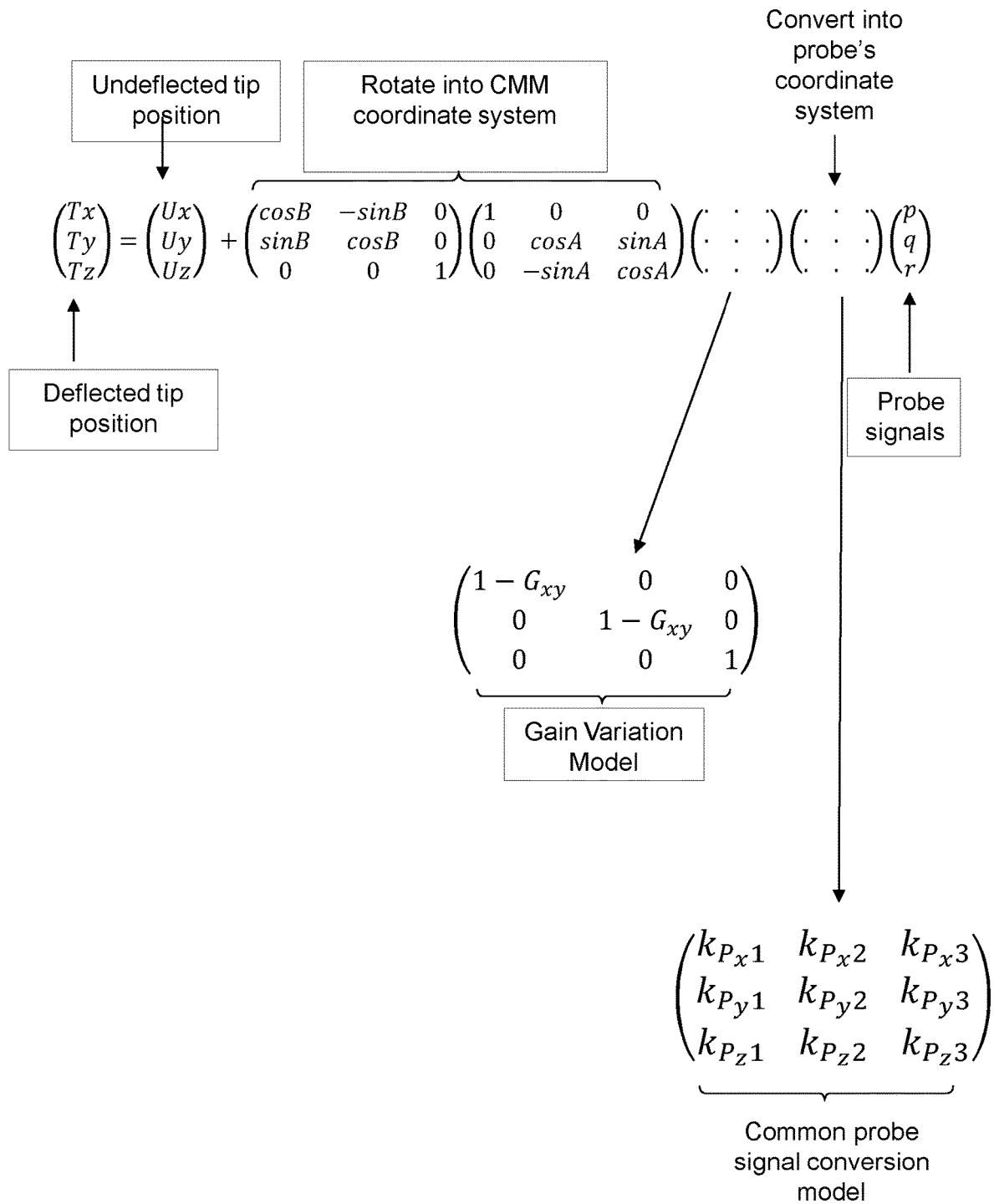
Figure 14:
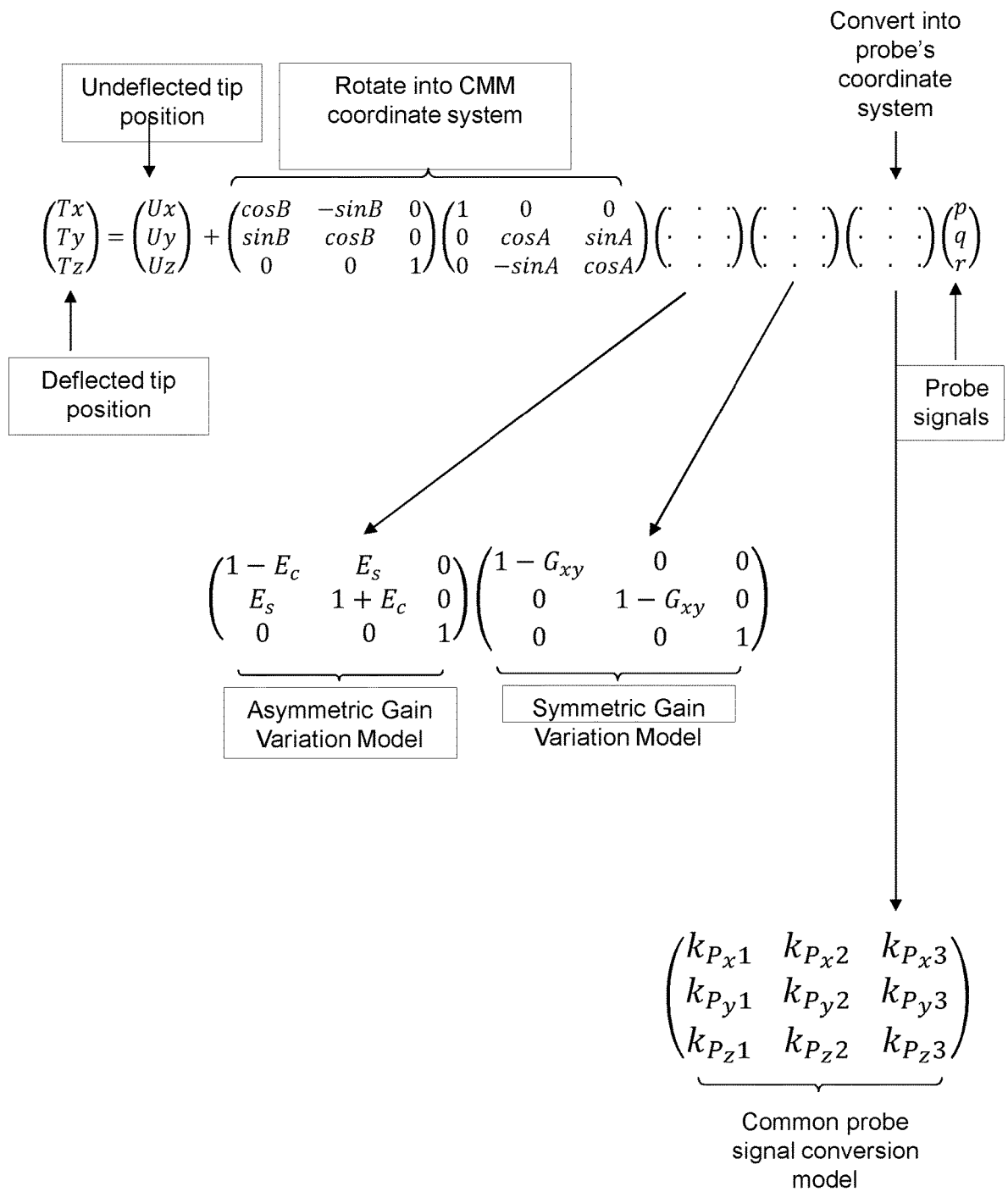

FIGS. 7a and 7b schematically illustrate a contact analogue probe measuring a calibration artefact in accordance with steps 202 to 206 of FIG. 4;

FIG. 8a shows a chart schematically illustrating the $C_X$, $C_Y$ positions at which measurement readings were taken;

FIG. 8b shows, the probe's stylus deflection signals (p, q) recorded at each of the measurement points identified in FIG. 8a when A=0° and B=0°;

FIG. 8c shows, the probe's stylus deflection signals (p, q) recorded at each of the measurement points identified in FIG. 8a when A=0° and B=90°;

FIG. 9 illustrates the measured diameter of the calibration sphere against stylus deflection for different nominal A head angles and different stylus deflections;

FIG. 10a schematically illustrates a plot of how the probe signal gain varies for the A-axis angles 30°, 45°, 60° and 90°;

FIG. 10b schematically illustrates how the probe signal gain might vary with A-axis and B-axis angles;

FIG. 11 schematically illustrates a scan of the calibration sphere taking place at a nominal A-axis angle of 30° (and a nominal B-axis angle of 0°);

FIG. 12 schematically illustrates a scan of the calibration sphere taking place at a nominal A-axis angle of 90° (and a nominal B-axis angle of 0°);

FIG. 13 provides an example function for converting probe signals into a deflected tip position in the coordinate measuring machine's coordinate system; and FIG. 14 provides another example function for converting probe signals into a deflected tip position.

Figure 1:
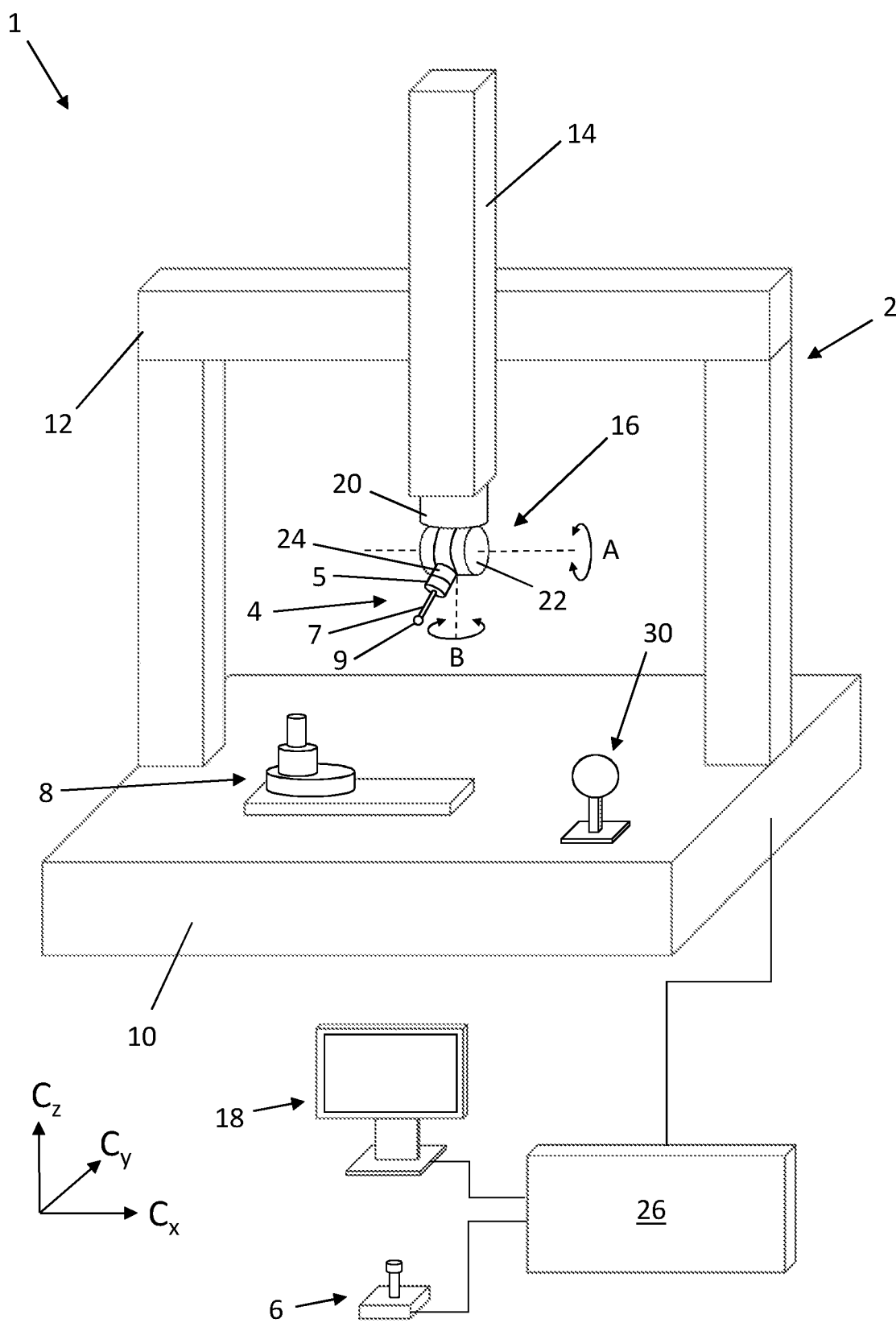

Referring to FIG. 1 there is shown a positioning apparatus 1 comprising a movement structure in the form of a coordinate measuring machine ("CMM") 2.

The CMM 2 comprises a base 10, supporting a frame 12 which in turn holds a quill 14. Motors (not shown) are provided to move the quill 14 along the three mutually orthogonal axes $C_X$, $C_Y$ and $C_Z$. The quill 14 holds an articulated head 16, which in this embodiment is a continuous scanning articulating head, such as the REVO articulated head available from Renishaw plc. As will be understood, a continuous scanning head enables orientation of a device mounted on it at substantially any angle about at least one axis and are often described as providing a near infinite number of angular orientations. Also, the orientation of the measurement device about an axis of a continuous scanning head can be changed during measurement (e.g. for a contact probe, whilst the contact probe is in contact with an object being inspected and acquiring measurement information such as stylus deflection signals). In contrast, an indexing head has a discrete number of defined ("indexed") positions at which the measurement device mounted on it can be locked. With an indexing head, the orientation of the measurement device can be changed, but not during the acquisition of measurement data.

The articulated head 16 has a base portion 20 attached to the quill 14, an intermediate portion 22 and a probe retaining portion 24. The base portion 20 comprises a first motor (not shown) for rotating the intermediate portion 22 about a first rotational axis B. The intermediate portion 22 comprises a second motor (not shown) for rotating the probe retaining portion 24 about a second rotational axis A that is substantially perpendicular to the first rotational axis. Although not shown, bearings may also be provided between the moveable parts of the articulated head 16. Further, although not shown, measurement encoders may be provided for measuring the relative positions of the base 10, frame 12, quill 14 and the parts of the articulated head 16 so that the position of the measurement probe 4 relative to a workpiece 8 located on the base 10 can be determined. As will be understood, such measurements can be used to determine the undeflected stylus tip 9 position which is used in functions described in more detail below.

A probe 4 is mounted on the quill 14 (in this embodiment via the articulated head 16). In the described embodiment, the probe 4 is a contact probe (e.g. a so called analogue/scanning probe). It comprises a probe body 5 and a deflectable stylus 7 (having a contact tip 9). In the embodiment described the probe 4 is removably mounted (e.g. using a kinematic mount) on the probe retaining portion 24. In the embodiment described the probe 4 can be held by the probe retaining portion 24 by the use of corresponding magnets (not shown) provided on or in the probe body 5 and probe retaining portion 24. The probe 4 could be automatically mountable/removable, e.g. from/to a probe storage rack (not shown) located in the CMM's movement volume.

The articulated head 16 allows the probe 4 to be rotated relative to the quill 14. In particular, in the embodiment described it enables the probe 4 to be positioned about two rotational degrees of freedom relative to the quill 14. The combination of the two rotational degrees of freedom provided by the articulated head 16 and the three linear ($C_X$, $C_Y$, $C_Z$) axes of translation of the CMM 2 allows the probe 4 to be moved/positioned in five degrees of freedom.

The positioning apparatus 1 also comprises a controller 26 for controlling the operation of the CMM 2 (either manually, e.g. via an input device such as joystick 6, or automatically, e.g. under the control of an inspection program). A display device 18 can be provided for aiding user interaction with the controller 26. The controller 26 could, for example, be a dedicated electronic control system and/or may comprise a personal computer.

In the current embodiment, the probe is a so-called "tip sensing" probe, in which deflections of the stylus tip are directly detected. Examples of such a probe are described in U.S. Pat. Nos. 6,633,051 and 7,847,955, the contents of which are incorporated by this reference. As described in those documents, tip sensing probes can, for example, be implemented by having an optical transducer system comprising a light source which produces a beam of light directed (e.g. internally of the stylus) toward the tip of the stylus, and a detector positioned to receive the beam and to produce a signal indicative of the lateral displacement of the stylus tip. A reflector element, such as a mirror or retro-reflecting device can be positioned at or toward the end of the stylus proximal the stylus tip (e.g. at or close to the stylus tip), for reflecting the beam back toward one or more sensors (e.g. which could be located in the probe body or at the end of the stylus proximal the probe body). Tip sensing probes are less susceptible to errors caused by inadvertent bending of the probe stylus (e.g. due to weight/sag/gravity/inertia) since any such bending will be sensed. Nevertheless, as will be understood, the invention is applicable to other types of probe, including non-tip sensing probes. In such cases other known factors such as droop may have to be factored in if necessary, using known techniques.

It should be noted that FIG. 1 provides only a top level description of a CMM 2. A more complete description of such apparatus can be found elsewhere; for example, see EP0402440 the entire content of which is incorporated herein by this reference.

During measurement of the workpiece 8 the contact tip 9 of the probe 4 is brought into contact with the workpiece 8 by motion of the CMM's X, Y, Z axes (i.e. $C_X$, $C_Y$, $C_Z$) and/or by rotation of the articulated head about the A and/or B axes. This causes the probe's stylus 7 and tip 9 to deflect. One or more transducers (not shown, but in this embodiment they are in the probe body 5) sense this deflection away from its rest position and provide one or more signals indicative of the extent of deflection. For example, voltage signals could be provided. In this embodiment, three separate signals are provided (e.g. p, q, r) which are responsive to deflections in different directions, e.g. approximately, but not necessarily, mutually orthogonal directions. As will be understood, the outputs from the probe will generally not be aligned with the CMM's coordinate system. As will also be understood, the signals may or may not be linearly proportional to deflection.

To make use of the probe signals (p, q, r), they need to be converted into spatial measurement values. This involves using a transformation model. In the present embodiment, this comprises transforming/converting the probe signals (p, q, r) into spatial measurements representative of the deflection of the probe in the probe's local coordinate system ($P_X$, $P_Y$, $P_Z$). As will be understood, the outputs from the probe may not be aligned with the probe's local coordinate system, and may not even be orthogonal to each other. As will also be understood, the probe's local coordinate system ($P_X$, $P_Y$, $P_Z$) is independent from the CMM's coordinate system ($C_X$, $C_Y$, $C_Z$) and since the probe can be rotated about the rotational axes, the probe's local coordinate system rotates with it. Accordingly, if desired, the measurement values can be rotated into the CMM's 2 coordinate system ($C_X$, $C_Y$, $C_Z$) so as to enable a determination of the deflected stylus tip 9 position in the CMM's 2 coordinate system $C_X$, $C_Y$, $C_Z$ space.

For example, the deflected tip position in the CMM's coordinate system could be determined as shown in Equation (1) below:

$$\begin{pmatrix} Tx \\ Ty \\ Tz \end{pmatrix} = \begin{pmatrix} Ux \\ Uy \\ Uz \end{pmatrix} + \begin{pmatrix} Dx \\ Dy \\ Dz \end{pmatrix} \quad (1)$$

where $(T_X, T_Y, T_Z)$ is the deflected tip position, $(U_X, U_Y, U_Z)$ is the undeflected tip position of the probe (known from the system and head geometry), and $(D_X, D_Y, D_Z)$ is the determined stylus deflection, which is described in more detail below. All these values are in the CMM's coordinate system $(C_X, C_Y, C_Z)$.

The stylus deflection in the CMM's coordinate system $(D_X, D_Y, D_Z)$ can be determined as shown in Equation (2) below:

$$\begin{pmatrix} D_x \\ D_y \\ D_z \end{pmatrix} = \begin{pmatrix} \cos B & -\sin B & 0 \\ \sin B & \cos B & 0 \\ 0 & 0 & 1 \end{pmatrix} \begin{pmatrix} 1 & 0 & 0 \\ 0 & \cos A & \sin A \\ 0 & -\sin A & \cos A \end{pmatrix} \begin{pmatrix} P_x \\ P_y \\ P_z \end{pmatrix} \quad (2)$$

where $(P_X, P_Y, P_Z)$ is the determined stylus deflection in the probe's local coordinate system, which is described in more detail below. The other two matrices shown in Equation 2 rotate the determined stylus deflection into the CMM's coordinate system based on the angle of the probe about the A and B axes.

As is currently known, it is necessary to transform/convert the probe's signals p, q, r to determine the stylus deflection in the probe's local coordinate system $(P_X, P_Y, P_Z)$, for example, using a transformation model such as that shown in Equation (3):

$$\begin{pmatrix} P_x \\ P_y \\ P_z \end{pmatrix} = \begin{pmatrix} k_{Px1} & k_{Px2} & k_{Px3} \\ k_{Py1} & k_{Py2} & k_{Py3} \\ k_{Pz1} & k_{Pz2} & k_{Pz3} \end{pmatrix} \begin{pmatrix} p \\ q \\ r \end{pmatrix} \quad (3)$$

Where $k_{Px1}$, $k_{Py1}$, etc are constants determined from a standard, known calibration routine performed at a particular head angle (e.g. as described in WO2006/114603). This is a linear transformation model, but as will be understood this need not necessarily be the case, and for example a non-linear transformation model could be used.

However, as mentioned above, it has been found that the relationship between the probe signals (p, q, r) and the deflection of the stylus tip varies depending on the orientation of the probe about the A and B axes. The variation has been found to exist even with rotation about a vertical axis (e.g. the B axis in this embodiment), and even when the probe is directed straight down.

Figures 2A, 2B:
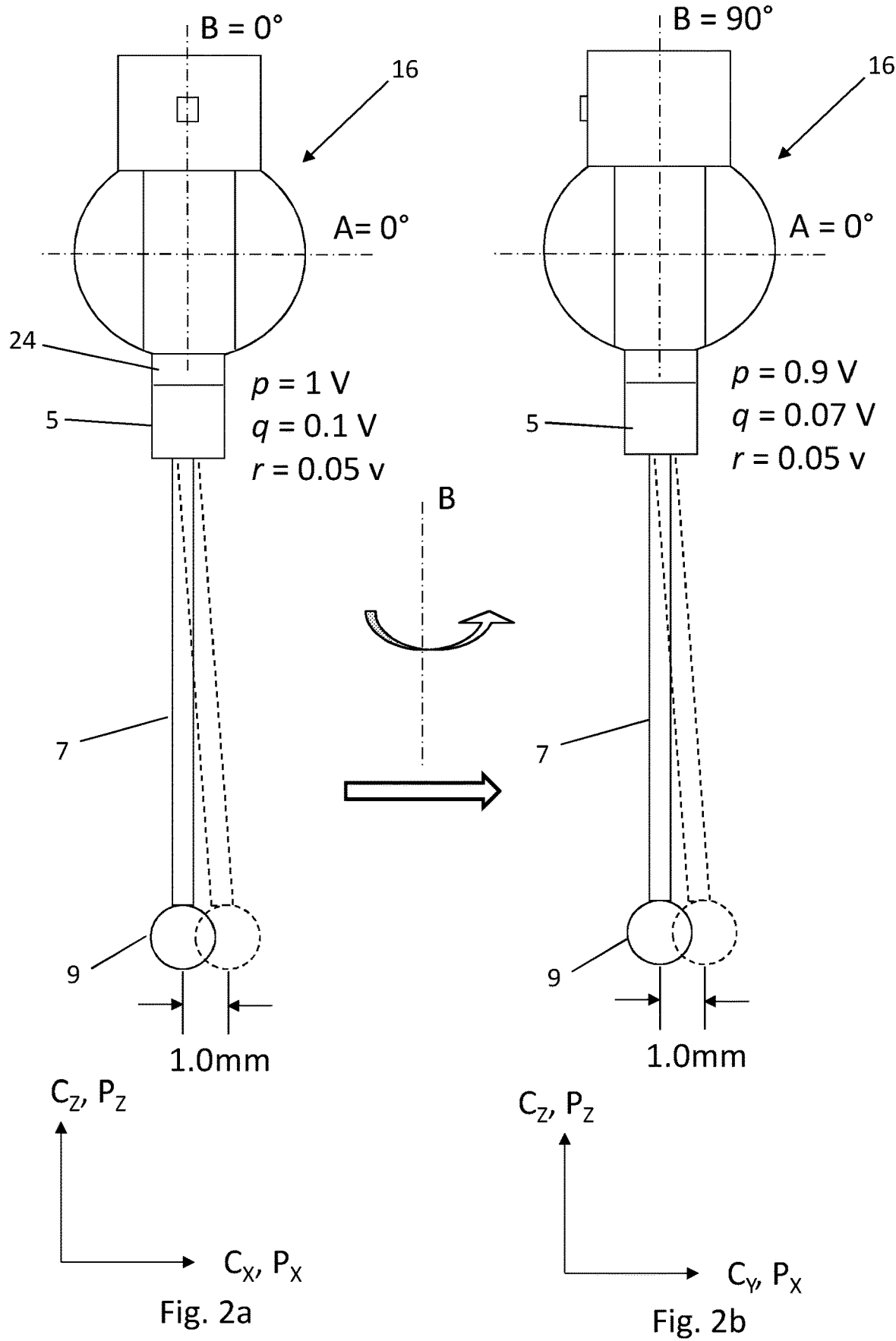

This anomaly (that is, the variation in the relationship between the stylus deflection signals (p, q, r) and the deflection of the stylus tip) is illustrated in FIGS. 2a and 2b. In FIG. 2a, the probe 4 is positioned at a first angular orientation about the articulated head's A and B axes, for example, A=0° and B=0°. The stylus tip is then caused to deflect by 1 mm in the probe's "$P_X$" dimension, which in the example shown is, at that point, aligned with the CMM's "$C_X$" dimension. This deflection can be achieved by moving the CMM's quill 14 (and hence the articulated head 16 and probe 4) along the CMM's $C_X$ dimension by 1 mm, so as to drive the stylus tip 9 perpendicularly into a workpiece. Accordingly, the stylus tip 9 deflects by an amount equal to the extent of the CMM motion, i.e. 1 mm. As shown, this gives rise to the probe signals of p=1V, q=0.1V and r=0.05V. Small q and r readings can be due to imperfections in the probe set up (e.g. slight misalignment of the transducer(s) with the stylus) or due to the probe being configured such that p, q and r are not perfectly aligned with the probe's $P_X$, $P_Y$ and $P_Z$ coordinate system.

The probe is then rotated by 90° about the B axis (see FIG. 2b), and then the same steps are repeated. That is, stylus tip 9 is caused to deflect by 1 mm in the probe's "$P_X$" dimension, which, at that point is now aligned with the CMM's "$C_Y$" dimension. This can be achieved by moving the CMM's quill 14 (and hence the articulated head 16 and probe 4) along the CMM's $C_Y$ dimension by 1 mm so as to drive the stylus tip 9 perpendicularly into a workpiece. As shown, this gives rise to the stylus deflection signals of p=0.9V, q=0.07V and r=0.04V ("V"=volt).

As shown, for the same stylus deflection, in the same probe dimension, different stylus deflection signals are provided (i.e. a different p, q and/or r output is experienced). This means that 1V output by p does not relate to the same amount of deflection in the probe's "$P_X$" dimension for all orientations.

Another way of illustrating this anomaly is as follows. For a first orientation (e.g. A=0° and B=0°) drive the stylus tip 9 perpendicularly into a workpiece by moving the quill along a first axis (e.g. along the $C_X$ axis) until a threshold p signal level is output (e.g. p=1V), and record the distance travelled by the quill along the $C_X$ axis between the initial point of contact and the point at which the threshold signal was achieved. Then, the probe is rotated to a new orientation (e.g. A=0° and B=90°) and the process is repeated again, although this time by motion of the quill along the $C_Y$ axis. Our inventors have identified that the distance travelled by the quill before the threshold p signal level (p=1V) is reached varies depending on the orientation. Accordingly, for example, the distance travelled in the $C_X$ dimension (and hence the stylus deflection in the probe's "$P_X$" dimension when B=0°) before p=1 V could be 1 mm, whereas the distance travelled in the $C_Y$ dimension (and hence the stylus deflection in the probe's "$P_X$" dimension when B=90°) before p=1 V could be 1.1 mm.

Either way, as will be understood, there appears to be an error in the probe signal, dependent on probe orientation, which will make its way through to the spatial measurements obtained from those probe signals. Such apparent probe errors will result in errors in spatial measurements obtained therefrom.

Although the above example illustrates the variation in the apparent stylus deflection behaviour with regard to the B axis position, it has been found that variation in the apparent stylus deflection behaviour can also vary with the A axis position as well.

Therefore, in addition to transforming/converting the probe signals (p, q, r) into spatial measurements representative of the deflection of the probe in the probe's local coordinate system $(P_X, P_Y, P_Z)$ (and optionally rotating the result into the CMM's 2 coordinate system $(C_X, C_Y, C_Z)$), the method of the present embodiment also corrects for the variation in the relationship between the probe signals (p, q, r) and the deflection of the stylus tip based on the orientation of the probe.

It is suspected that such variation is predominantly due to the stiffness characteristics of the apparatus, e.g. the CMM 2 and/or articulated head 16. When a force is applied to the stylus tip 9, the stylus 7 will deflect with respect to the probe body 5, which will be detected by the probe's transducer. However, there will also be some untransduced deflection of the articulated head 16 and/or CMM 2 structure that will depend on the direction and magnitude of the applied force. This untransduced deflection is indistinguishable from an equivalent error in the stylus deflection measurements.

An example technique for overcoming this error will be explained with reference to FIGS. 3 to 14. The technique involves determining, and generating a model for modelling, the variation in the relationship between the one or more probe signals and the deflection of the stylus away from its rest/zero force position. In this particular example, the model is incorporated into an overarching transformation model (which is used to transform/convert the probe signals into dimensional measurement values) so as to thereby compensate for differences in the relationship between stylus deflection signal(s) and deflection of the stylus at different orientations about the articulated heads axes.

Figure 3:
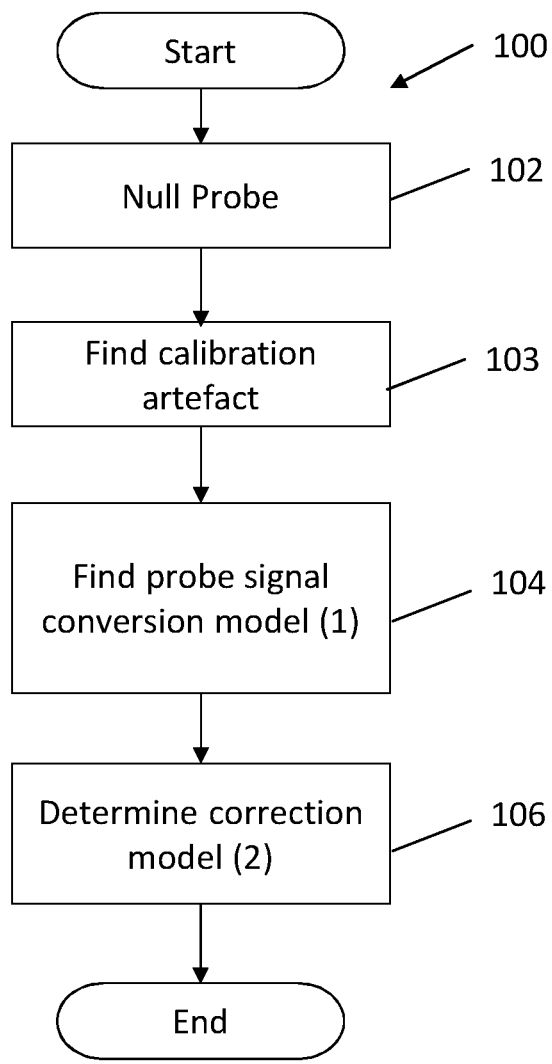
FIG. 3 illustrates an example process for calibrating a contact analogue probe according to the present invention.

FIG. 3 provides a top level flow-chart for a process 100 of determining such a transformation model for a probe 4. The method begins at the optional step 102 of nulling the probe 4. This is a standard well known process for analogue/scanning probes whereby the probe's transducer signals are measured when the probe is in free space (i.e. when the stylus is in a rest/undeflected position).

At step 103, a calibration artefact 30 located in the CMM's measurement volume is found by taking some measurements of it using the probe 4. At this stage a default transformation model can be used to convert the probe's signals into position measurements.

At step 104, a probe signal conversion model is found. This is explained in more detail with reference to FIG. 4.

Then, at step 106, a correction model which describes how the relationship between the probe signal and the stylus deflection varies with the articulated head angle is determined. This is explained in more detail with reference to FIG. 5.

The probe signal conversion model determined at step 104 and the correction model determined at step 106 (which, for the purposes of the invention, together can be referred to as a "transformation model") can then subsequently be used in order to convert stylus deflection signals into accurate spatial measurement values, for example as described in more detail below with reference to FIG. 6.

With reference to FIG. 4, an example process 200 for finding the probe signal conversion model is shown. The process begins at step 202 at which an article, in this case the calibration artefact 30, is measured at a first articulated head angle (e.g. in this embodiment, A=0° and B=0°). In this embodiment, the measurement operation at step 202 comprises performing a scan (e.g. around the equator 34) of the calibration artefact's sphere 32 (see FIG. 7a), by translationally moving the quill 14 in a circle around the sphere 32 with the stylus tip biased against the sphere 32. This scan is repeated with a different stylus deflection (different measuring force). Also, scans could be performed in multiple scan directions, e.g. as described in WO02/073128.

The measurement operation at step 202 also comprises taking point measurements (e.g. four point measurements) spaced around the sphere, e.g. at points 36 indicated in FIG. 7a. Each of the point measurements comprise pushing the stylus tip 9 perpendicularly into the sphere 32 so as to cause stylus deflection signals to be obtained over a range of stylus deflections, e.g. nominally between 50 μm (microns) and 200 μm (microns).

Example results of the measurements obtained at step 202 are schematically illustrated in FIGS. 8a, 8b and 8c. FIG. 8a shows a chart schematically illustrating the $C_X$, $C_Y$ positions at which measurement readings were taken. Each dot represents the position at which one measurement reading was taken. As can be seen, the scans involved moving the quill 14 of the CMM 2 in a circle, and the touch points (highlighted by regions 36' on FIG. 8a) involved moving the quill 14 into and away from the sphere 32 in a nominally straight line. The chart of FIG. 8a is valid for both B=0° and B=90°.

FIG. 8b shows, the probe's stylus deflection signals (p, q) recorded at each of the measurement points identified in FIG. 8a when A=0° and B=0°. Since the quill 14 of the CMM 2 was moved in a circle, and since the profile of the sphere's equator 34 is circular, it would be expected that the profile of the probe's "p" signals plotted against its "q" signals would also be circular. However, as shown in FIG. 8b, the profile of p against q is elliptical, and in this case the major axis extends along the p axis. This is due to an apparent difference in the probe signal behaviour for p and q (for example, in this case, and as shown, p appears to be more responsive to/provides a bigger signal for a given deflection than q).

At step 204, it is then determined if measurements are required at a different head angle. In this embodiment, measurements are to be obtained at two different head angles, although measurements can be obtained at more head angles (and any combination of A and B angles can be used). Accordingly, at step 206 the articulated head 16 is operated so as to reorient the probe to a second articulated head angle (e.g. in this embodiment, A=0°, B=90°). Step 202 is then repeated such that the measurements described above (e.g. the two scans and four point measurements) are repeated at the second articulated head angle (illustrated in FIG. 7b). As mentioned above, the chart of FIG. 8a is equally applicable for illustrating the $C_X$, $C_Y$ positions of the quill 14 at the points at which measurements are taken during the scans and point measurements.

FIG. 8c shows the probe's stylus deflection signals (p, q) recorded at each of the measurement points identified in FIG. 8a when A=0° and B=90°. As can be seen, the profile of p against q is elliptical like that shown in FIG. 8b, but as can be seen compared to FIG. 8b, the major axis has been rotated by 90° (and in this case the major axis extends along the q axis in FIG. 8c). As illustrated, unlike the situation when A and B=0°, in this case q appears to be more responsive to/provides a bigger signal for a given deflection than p.

Accordingly, it can be seen that there is what appears to be an error in the measurements obtained by the probe. The probe signal behaviour appears to differ depending on the orientation of the probe. In other words, there appears to be a variation in the gain of the probe signal depending on orientation. However, as can also be seen, since the error does not rotate with the probe, it can be deduced that the error likely arises from the structure of the machine.

At step 204, it is then determined that no further measurements are required at this stage and so the process proceeds to step 208. At step 208, a least squares best fit optimisation process is used to determine the probe signal conversion model. For example, with reference to Equation (4) below, the undeflected tip positions $U_x$, $U_y$, $U_z$ positions are known, the probe's signals p, q, r are known, the head angles A and B are known, and it is known that the stylus tip positions $T_x$, $T_y$, $T_z$ should all lie on the surface of the sphere. Accordingly, an optimisation process (e.g. an iterative process), such as a least squares best fit optimisation process, can be used to deduce the values of the blank 3×3 matrix shown in Equation (4) below which would result in the measurements obtained with B=0° and B=90° to lie as close as possible to the surface of the sphere.

$$\begin{pmatrix} Tx \\ Ty \\ Tz \end{pmatrix} = \begin{pmatrix} Ux \\ Uy \\ Uz \end{pmatrix} + \begin{pmatrix} \cos B & -\sin B & 0 \\ \sin B & \cos B & 0 \\ 0 & 0 & 1 \end{pmatrix} \begin{pmatrix} 1 & 0 & 0 \\ 0 & \cos A & \sin A \\ 0 & -\sin A & \cos A \end{pmatrix} \begin{pmatrix} \cdots \\ \cdots \\ \cdots \end{pmatrix} \begin{pmatrix} p \\ q \\ r \end{pmatrix} \quad (4)$$

That matrix can then be used as the probe signal conversion model. An example matrix could be for instance similar to that shown in Equation (3) above, e.g.:

$$\begin{pmatrix} k_{P_x1} & k_{P_x2} & k_{P_x3} \\ k_{P_y1} & k_{P_y2} & k_{P_y3} \\ k_{P_z1} & k_{P_z2} & k_{P_z3} \end{pmatrix}$$

However, in this case, since the probe signal conversion model is determined from measurements obtained at a number of different orientations, the probe signal conversion model could be described as an "averaged", "amalgamated", "consolidated" or "optimised" probe signal conversion model (whereas in Equation (3) the matrix would have been determined from measurements obtained at just one head orientation). Optionally, the probe signal conversion model could be described as a "common" probe signal conversion model since it is determined from, and subsequently used as a common conversion model for, a plurality of different orientations. As will be understood, this probe signal conversion model is an example of an orientation-independent signal conversion model. It does not take the orientation of the probe about any of the axes as input parameters.

As will be understood, by taking measurements at appropriate different head angles, CMM effects can be averaged to zero in the probe coordinate system.

As will be understood, the order in which measurements are taken is not important for the present invention. For example, rather than performing all measurements at the first articulated head angle and then performing all the measurements at the second articulated head angle, the obtaining of the measurements at the first and second articulated head angles (or all if there are more than two head angles) could be interleaved.

Furthermore, it is not necessary for the same measurements to be obtained at each of the different articulated head angles. For example, it might be that data for four different articulated head angles is to be obtained (e.g. A=0° and B=0°, 45°, 90° and 135°) and rather than performing the scan measurements for each articulated head angle, it is possible that scan measurements are performed for only two of the four articulated head angles (whilst, for example, point measurements are still performed for all four articulated head angles).

As will be understood, other types of measurements can be obtained instead of or as well as those described above. For example, spiral scans of the surface of the calibration artefact could be performed. Also, although in the described embodiments measurements are obtained at different stylus deflections/forces, it is not necessary for measurements to be obtained at different stylus deflections/probe forces. For example, there could be just one scan performed at each head angle. In this case, the form of the gain could be assumed, for example to be linear and to cross through 0, or for example to have an assumed non-linear form. This would enable some errors to be identified, although it wouldn't be possible to be confident that probe signal gain errors are mapped out. Alternatively, measurements at multiple stylus deflections/probe forces could be obtained at some (e.g. one) head angle, but not other head angles.

Figure 5:
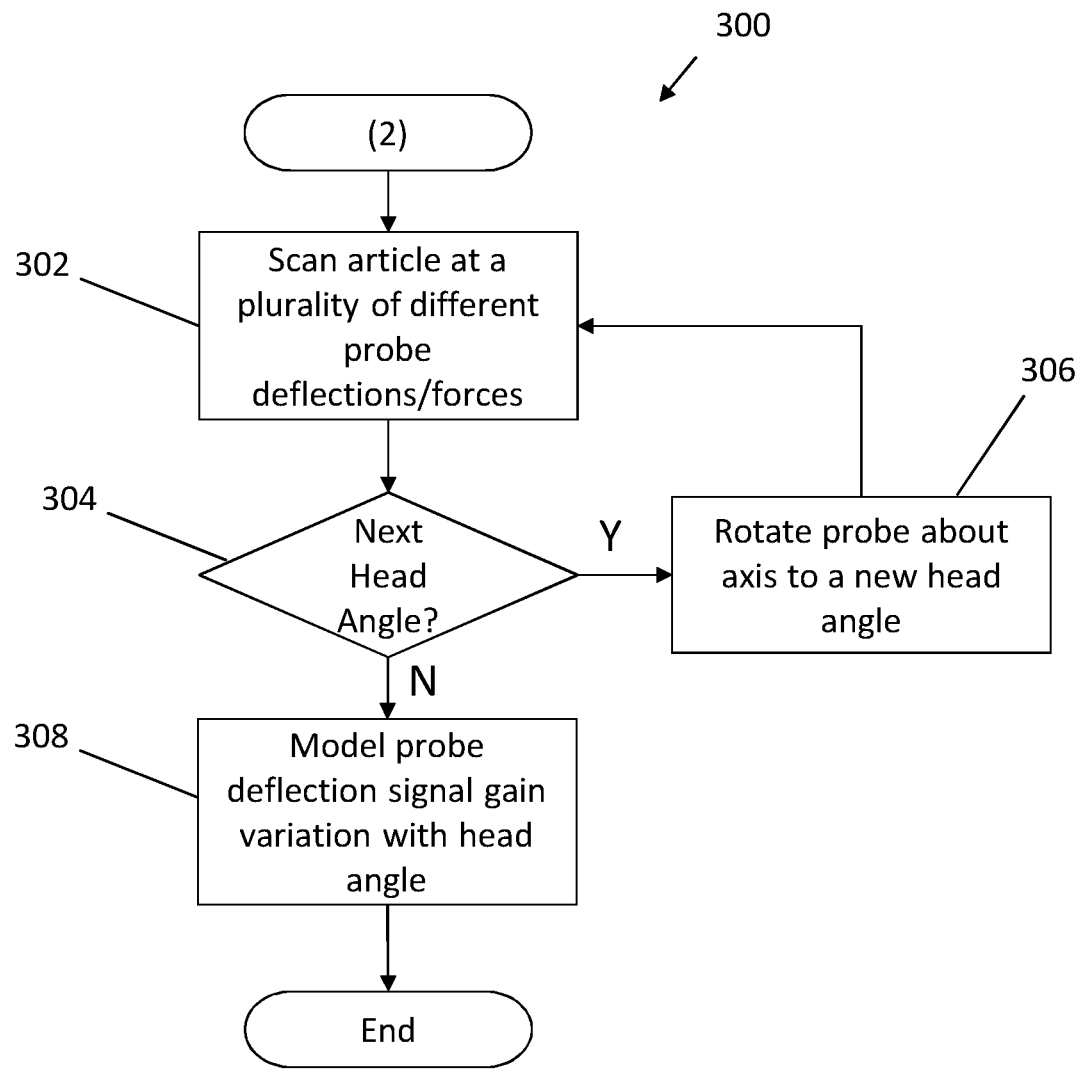
FIG. 5 illustrates an example process for determining a model for modelling any apparent variation in the gain of the probe signals depending on orientation about an axis.

With reference to FIG. 5, an example process 300 for determining a correction model describing the variation in the relationship between the probe signal and the stylus deflection dependent on head angle is shown. The process begins at step 302 by operating the CMM 2 to scan the calibration sphere 32 (with a given head angle) at a number of different stylus deflections. For example, this could comprise scanning a circle about the surface of the sphere 32 at a given nominal A head angle e.g. A=30° (see FIG. 11). In this embodiment, the scan is performed by rotating the probe about the articulated head's rotational axes. As shown, due to the sphere 30 and stylus tip 9 having a radius, the probe needs to be rotated about the A axis and so A is not actually at 30°. However, the angle about the A axis at which a line 38 extending between the point of rotation of the articulated head and the centre of the circle 40 about which the scan takes place is 30°, and so A is described as being nominally at 30°. As will also be understood, the amount by which the probe is shown as being rotated about A is grossly exaggerated in the drawing due to the relative scales of the probe and calibration artefact. Furthermore, as will be understood, rather than the scans being performed by rotating the probe about one or more of the articulated head's axes, the scans could be performed by translationally moving the quill 14 using the CMM's X, Y and Z axes. In this case, the head's A axis could truly be at 30°.

The same scan is performed at at least two different stylus deflections (e.g. two different probe forces), and in this case is performed at four different stylus deflections. As will be understood, this need not necessarily be the case. For example, the measurement could be performed at just one stylus deflection. This is especially the case, for instance, if future measurements were only to be obtained at that stylus deflection and/or if an assumption can be made about the variation in the gain (e.g. a linear variation back to zero).

At step 304 it is then determined if measurements are required at a different head angle. In this embodiment, measurements are to be obtained at four different nominal A axis angles (30°, 45°, 60° and 90°; see FIG. 12 for A=90°). Accordingly, at step 306 the articulated head 16 is operated so as to reorient the probe to the next nominal A axis head angle. Step 302 is then repeated as above for the new nominal head angle. This loop continues until at step 304 it is determined that no further measurements at different head angles are needed.

Control of the process 300 then proceeds to step 308 at which it is determined how the stylus deflection signal gain appears to vary with head angle. Step 308 (for which an example method is explained below in more detail) could be schematically summarised as: i) extracting a metric (such as measured diameter, radius, ellipticity) from each scan; ii) determine how that metric varies with stylus deflection/force; iii) and then determine how the slope of that variation (determined in ii) varies with head angle.

For example, using the matrix of Equation (4), the probe signals obtained during the scans of the process of FIG. 5 are converted into position measurements. The position measurements from each scan are then analysed to determine the measured diameter of the sphere 32. This is done for each stylus deflection at each head angle. For illustrative purposes, the measured diameter of the sphere against stylus deflection for different nominal A head angles and different stylus deflections is shown in FIG. 9. As can be seen, in this example, for any given head angle, the measured diameter of the sphere 32 increases with stylus deflection. As will be understood, the gradient of each line fitted to the points represents the apparent probe signal gain for each head angle. As illustrated, each head angle has a different gradient and therefore a different apparent gain. This illustrates that the gain of the probe signal appears to vary with head angle. In other words, as illustrated by this example, the relationship between the probe signals and the extent of deflection of the stylus varies with head angle.

FIG. 10a schematically shows a plot of the gradient/gain values for the A head angles 30°, 45°, 60° and 90°. The apparent gain variation can be represented by a function. For example, the apparent gain variation dependent on the angle of the head about the A axis could be modelled by the function set out in Equation (5) below:

$$G_{xy} = k_1 + k_2 \sin(A) + k_3 \cos(A) \quad (5)$$

where $k_1$, $k_2$ and $k_3$ are constants chosen to fit to the measured gains (e.g. so that the function describes the line shown in FIG. 10a which is fitted to the measured gains).

This could then be incorporated into a matrix which could be used during measurement to compensate for the apparent variation in the gain. For example, Equation (6) below illustrates an example transformation model which in addition to the transformation model shown in Equation (3) includes a matrix which models, and can be used to compensate for, the apparent variation in the gain of the probe signals at different head angles:

$$\begin{pmatrix} P_x \\ P_y \\ P_z \end{pmatrix} = \begin{pmatrix} 1-G_{xy} & 0 & 0 \\ 0 & 1-G_{xy} & 0 \\ 0 & 0 & 1 \end{pmatrix} \begin{pmatrix} k_{P_x1} & k_{P_x2} & k_{P_x3} \\ k_{P_y1} & k_{P_y2} & k_{P_y3} \\ k_{P_z1} & k_{P_z2} & k_{P_z3} \end{pmatrix} \begin{pmatrix} p \\ q \\ r \end{pmatrix} \quad (6)$$

As will be understood, in contrast to $G_{xy}$ being a function, it could instead be a look-up table. Accordingly, the apparent gain variation could be modelled by a look-up table. If necessary, interpolation of the look-up table could be used to populate/determine values not directly measured.

For ease of reference, Equation (1) in expanded form to incorporate the above described matrix which models the apparent gain variation so as to compensate for variations in the relationship between the probe signals and deflection of the stylus at different head angles is illustrated in FIG. 13. FIG. 13 also breaks down and labels the various matrices to explain what their purpose is for so as to aid understanding.

In the above described embodiments, the gain is assumed to be linear (and so for example straight lines are shown as fitted to the points in FIG. 9). However, as will be understood, this need not necessarily be the case and the gain could be non-linear (in which case the lines fitted to the points can be curved).

The function of Equation (5) is only truly representative for the B angle at which the scans taken at different A angles were measured. It is possible to assume that the apparent gain variation dependent on the A angle, is the same at all B angles, or it is possible to predict how the apparent gain variation varies with B angle. However, if it is preferred that an assumption/prediction is not made, then it is possible to consider and model for variation about B angle too. In this case, the process of FIGS. 5, 11, 12 as described above can be repeated for different (nominal) B angles, whereby the gain for different A and B angles is found. FIG. 10b schematically illustrates how the gradient/gain might vary with A and B angle, with the dots representing the determined gains for different A and B angles. This variation can be represented by a function. For example, the apparent gain variation dependent on the A and B angles could be modelled by the function set out in Equation (7) below:

$$G_{xy} = k_{A1} + k_{A2} \sin(A) + k_{A3} \cos(A) \quad (7)$$

where:

$$k_{A1} = k_{B11} + k_{B12} \sin(2B) + k_{B13} \cos(2B)$$

$$k_{A2} = k_{B21} + k_{B22} \sin(2B) + k_{B23} \cos(2B)$$

$$k_{A3} = k_{B31} + k_{B32} \sin(2B) + k_{B33} \cos(2B)$$

and where $k_{Bij}$ are constants chosen to fit to the measured gains (e.g. a function which describes the surface shown in FIG. 10b which is fitted to the measured gains).

As will be understood, the above $G_{xy}$ functions are only example functions. As will be understood, other functions could be used.

The above technique assumes that the apparent gain variation is symmetrical (e.g. in $P_x$ and $P_y$). The method could be extended to include a model which describes any apparent asymmetry in the gain variation (e.g. any asymmetry in $P_x$ and $P_y$). For example, if there is asymmetry, the scans will not be circular. For example, they could be approximately elliptical and in which case it could be advantageous to try to model the elliptical nature of the apparent gain variation. Accordingly, instead of simply determining diameter, the ellipticity of the scans can be determined and modelled. FIG. 14 shows that an additional matrix can be used to correct for any apparent asymmetrical (e.g. elliptical) gain variation.

In this case, as well as determining diameter (or radius) of the scans for a number of stylus deflections, and determining how that varies with stylus deflection, other metrics can also be determined. For example, the metric could be the elliptical shape of the scan (which could be described by parameters), and in a similar way to the above embodiment it will be necessary to determine how the elliptical shape varies with deflection, and the slope of that variation can be used to determine the elliptical gains $E_c$ $E_s$ (of the asymmetric gain variation model shown in FIG. 14) at the given head angle.

The variation of $E_c$ $E_s$ with head angle can be modelled as before. Accordingly, as will be understood, $E_c$ and $E_s$ of the asymmetric gain variation model shown in FIG. 14 can each be a function which has the head angles A and/or B as inputs/variables. For example, $E_c$ and $E_s$ could comprise functions as set out in Equations (8) and (9) below:

$$Ec = c_{A1} + c_{A2} \sin(A) + c_{A3} \cos(A) \quad (8)$$

where:

$$c_{A1} = c_{B11} + c_{B12} \sin(2B) + c_{B13} \cos(2B)$$

$$c_{A2} = c_{B21} + c_{B22} \sin(2B) + c_{B23} \cos(2B)$$

$$c_{A3} = c_{B31} + c_{B32} \sin(2B) + c_{B33} \cos(2B)$$

and $$Es = s_{A1} + s_{A2} \sin(A) + s_{A3} \cos(A) \quad (9)$$

where:

$$s_{A1} = s_{B11} + s_{B12} \sin(2B) + s_{B13} \cos(2B)$$

$$s_{A2} = s_{B21} + s_{B22} \sin(2B) + s_{B23} \cos(2B)$$

$$s_{A3} = s_{B31} + s_{B32} \sin(2B) + s_{B33} \cos(2B)$$

and where $c_{Bij}$ and $s_{Bij}$ are constants chosen to fit to the measured variation in elliptical gains.

As will be understood, other shaped variations could be present (e.g. such that the variation is not strictly elliptical), in which case slightly different models might be required.

As will be understood, the gain variation model of FIG. 13, and the asymmetric and symmetric gain variation models of FIG. 14 could be described as being orientation-dependent probe signal conversion models. They take the orientation of the contact analogue probe about at least one axis (and in this case both axes) of the articulated head as input parameters.

Figure 6:
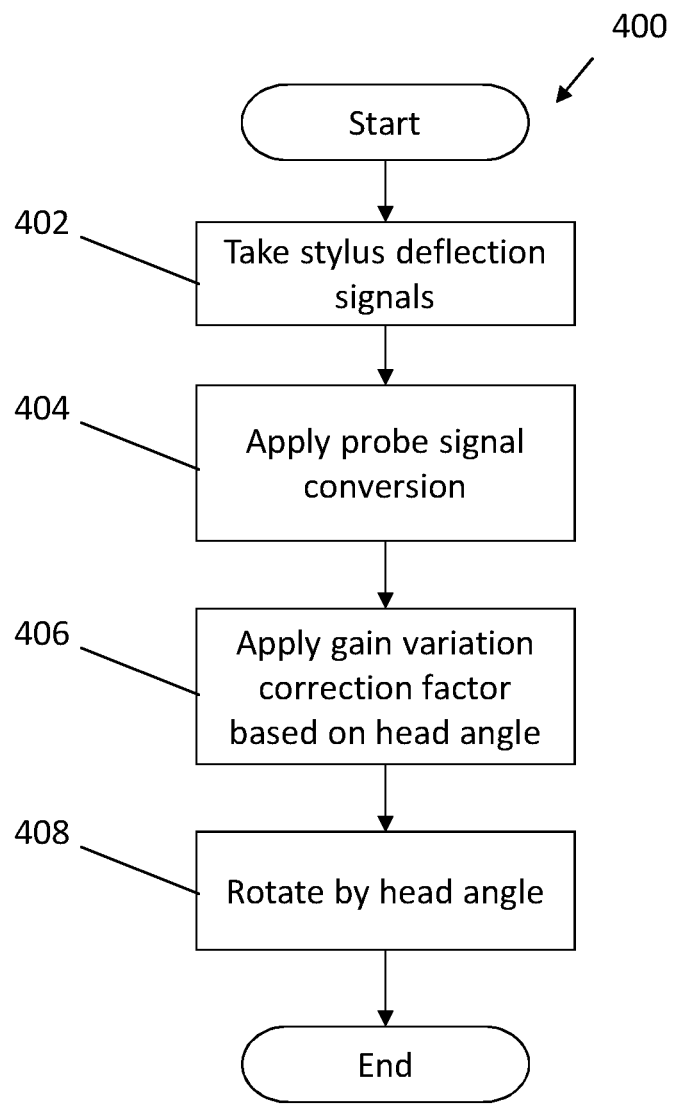
FIG. 6 illustrates an example process in which the model according to the invention can be used.

FIG. 6 illustrates an example process 400 of how the gain variation model can be used in practice during subsequent collection of measurements points using the contact analogue probe 4. The process begins at step 402 during which the object 8 and/or the contact analogue probe 4 are moved so as to bring the stylus 7 (in particular the stylus tip 9) into contact with the object, thereby causing the stylus to deflect. The contact analogue probe provides signal(s) (in this case, p, q, r signals) in response to the deflection, the level of the signal(s) being indicative of the extent of deflection. As will be understood, the signal(s) can be digital or analogue in form. At step 404 the common probe signal conversion model is used to convert the signals into spatial measurements in the probe's coordinate system ($P_x$, $P_y$, $P_z$). At step 406, the probe signal gain variation model is used to apply a gain variation correction factor dependent on the orientation of the contact analogue probe about the A and B axes of the articulated head. Accordingly, this involves feeding into the model the angle about the A and B axes that the contact analogue probe was oriented at the point the probe signal was provided. This then gives a spatial measurement in the probe's coordinate system ($P_x$, $P_y$, $P_z$) which has been compensated for apparent variations in the gain of the probe signals. At step 408, the spatial measurements are then rotated into the CMM's coordinate system (e.g. using the matrices shown in FIGS. 13 and 14). This can then be added to the undeflected tip position (which can be known from the system and head geometry, and for example deduced from linear position encoders mounted on the CMM's X, Y and Z axes and rotary position encoders mounted on the articulated head so that the position and orientation of the articulated head can be determined).

Accordingly, in embodiments in which measurements are obtained by scanning the contact analogue probe along the surface of the object, and during which the orientation of the contact analogue probe 4 is continuously changed about one or more of the axes of the articulated probe head, the gain correction factor applied by the gain variation model continuously changes depending on the angle of the one or more axes (e.g. continuously changes with the continuous change in orientation about the axes).

The above embodiments are explained by way of having separate matrices for the initial probe signal conversion (the "common" probe signal conversion model) and the (asymmetric and symmetric) gain variation model, but as will be understood this need not necessarily the case and they could be provided by one common matrix. As also explained above, rather than using one or more matrices, a function or lookup table could be used instead.

In the above described embodiment, a common probe signal conversion model is determined from measurements obtained at a number of different orientations. As will be understood, this common probe signal conversion model could be used in its own right, without the additional gain variation models. Doing so can be advantageous over just determining a probe signal conversion model from measurements obtained at just one orientation and then assuming that the same probe signal conversion model applies to the other orientations (and merely rotating the spatial measurement values into the CMM's coordinate systems), since variations in behaviour can be smoothed/averaged out.

The above described embodiments correct for $P_x$ and $P_y$. As will be understood, the same technique can be used to correct for $P_z$. In this case, measurements along the probes $P_z$ axis can be taken (e.g. by touching the calibration artefact with the probe "end-on") at different stylus deflections.

In the described embodiment, the coordinate positioning machine is a serial CMM (i.e. in which the three linear degrees of freedom is provided by three independent, orthogonal axes of motion). However, as will be understood, the invention can also be used to control the movement of other types of coordinate positioning machines, such as parallel CMMs, robot arms or the like. The invention can also be used with not just dedicated CMMs, but also with other types of coordinate positioning machines such as machine tools. Furthermore, as will be understood, the invention is also suitable for use with Cartesian and non-Cartesian positioning machines, such as polar and spherical coordinate positioning machines.

The invention claimed is:

1. A method of calibrating a contact probe having a deflectable stylus and configured to provide at least one signal which is indicative of the extent of deflection of the stylus, the contact probe being mounted on a coordinate positioning machine which facilitates rotation of the contact probe about at least one axis, the method comprising:
   taking measurement data obtained with the contact probe positioned at a plurality of different orientations about the at least one axis, the different orientations including at least a first contact probe head angle and a second contact probe head angle rotated from the first head angle about the at least one axis; and
   determining from the measurement data at least one gain variation model which models any apparent variation in the gain of the at least one signal dependent on the orientation of the contact probe about the at least one axis.

2. The method as claimed in claim 1, in which the measurement data is obtained at a plurality of different stylus deflections for at least one orientation about the at least one axis.

3. The method as claimed in claim 2, in which for a plurality of the different orientations, measurement data is obtained at a plurality of different stylus deflections.

4. The method as claimed in claim 1, in which the contact probe is configured to provide at least first and second probe signals, and in which the at least one gain variation model models any apparent variation in the gains of the at least first and second probe signals dependent on the orientation of the contact probe about the at least one axis.

5. The method as claimed in claim 1, in which the coordinate positioning machine facilitates rotation of the contact probe about at least two axes, and in which the method comprises:
   taking measurement data obtained with the contact probe positioned at a plurality of different orientations about the at least two axes; and
   determining from the measurement data at least one gain variation model which models any apparent variation in the gain of the at least one probe signal dependent on the orientation of the contact probe about the at least two axes.

6. The method as claimed in claim 1, in which the measurement data comprises a first set of measurement data obtained at a first orientation about the at least one axis and at least one second set of measurement data obtained at a second orientation about the at least one axis, and in which the at least one second set of measurement data is less comprehensive than the first set of measurement data.

7. The method as claimed in claim 6, comprising using at least the at least one second set of measurement data to determine how the gain of the one or more probe signals appears to vary depending on the orientation of the contact probe about the at least one axis.

8. The method as claimed in claim 1, further comprising determining an orientation-independent probe signal conversion model.

9. The method as claimed in claim 8, in which the at least one gain variation model is configured for correcting conversions made using the orientation-independent probe signal conversion model.

10. The method as claimed in claim 1, comprising subsequently using the contact probe to measure an artefact and using the at least one gain variation model to transform the probe's at least one signal into a spatial measurement value.

11. The method as claimed in claim 1, in which the coordinate positioning machine comprises a continuous scanning articulated head which provides the at least one axis, and in which the articulated head is mounted on a movement structure which facilitates translational movement of the head.

12. The method as claimed in claim 1, in which the at least one gain variation model comprises at least one matrix, at least one function, and/or at least one look-up table.

13. The method as claimed in claim 1, comprising determining at least a first gain variation model which models apparent symmetric variations in the gain of the at least one probe signal dependent on the orientation of the contact probe about the at least one axis, and a second gain variation model which models apparent asymmetric variations in the gain of the at least one probe signal dependent on the orientation of the contact probe about the at least one axis.

14. The method as claimed in claim 1, wherein the contact probe is an analog probe.

15. The method as claimed in claim 1, wherein the gain of the at least one signal quantifies variation of the at least one signal with stylus deflection.

16. A method of transforming at least one probe signal from a contact probe into a spatial measurement value, the contact probe having a deflectable stylus and in which the at least one probe signal is indicative of the extent of deflection of the stylus, in which the contact probe is mounted on an articulated continuous scanning head of coordinate positioning machine which facilitates rotation of the contact probe about at least one axis during collection of measurements using the contact probe, the method comprising:
  converting the at least one probe signal into a spatial value using at least one probe signal gain variation correction factor which is dependent on the orientation of the contact probe about the at least one axis.

17. A method of calibrating a contact probe having a deflectable stylus configured to provide at least one signal which is indicative of the extent of deflection of the stylus, the contact probe being mounted on a coordinate positioning machine which facilitates rotation of the contact probe about an axis of the stylus, the method comprising:
  taking measurement data obtained with the contact probe positioned at a plurality of different orientations about the stylus axis, the different orientations including at least a first contact probe head angle and a second contact probe head angle rotated from the first head angle about the axis; and
  determining from the measurement data at least one gain variation model which models any apparent variation in the gain of the at least one signal dependent on the orientation of the contact probe about the stylus axis.

* * * * *